Oct. 10, 1961
W. H. LOCKWOOD
3,003,647
TIERABLE AND END-NESTABLE RECEPTACLES
Filed Aug. 3, 1960
13 Sheets-Sheet 1
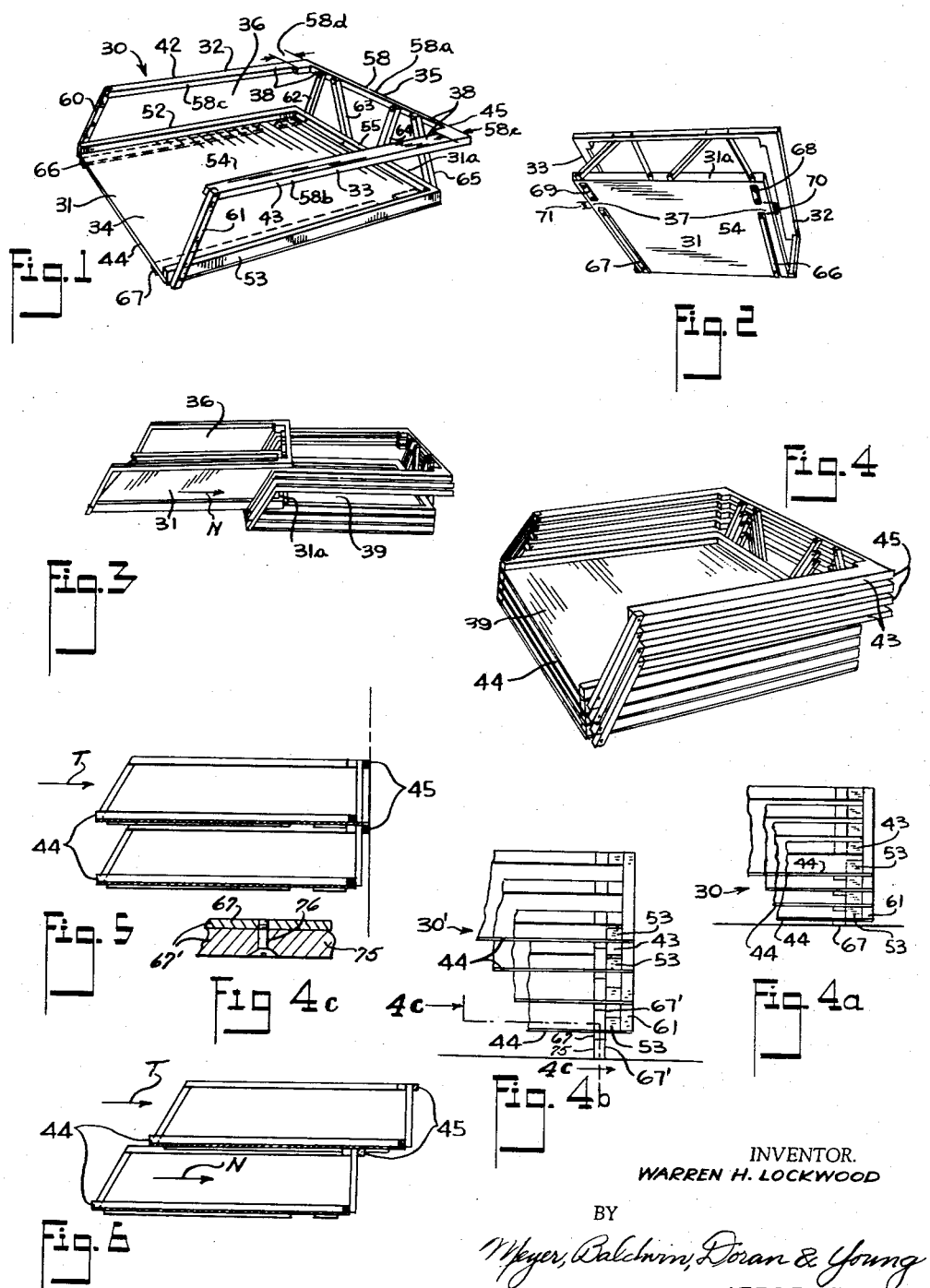
INVENTOR.
WARREN H. LOCKWOOD
BY
Meyer, Baldwin, Doran & Young
ATTORNEYS

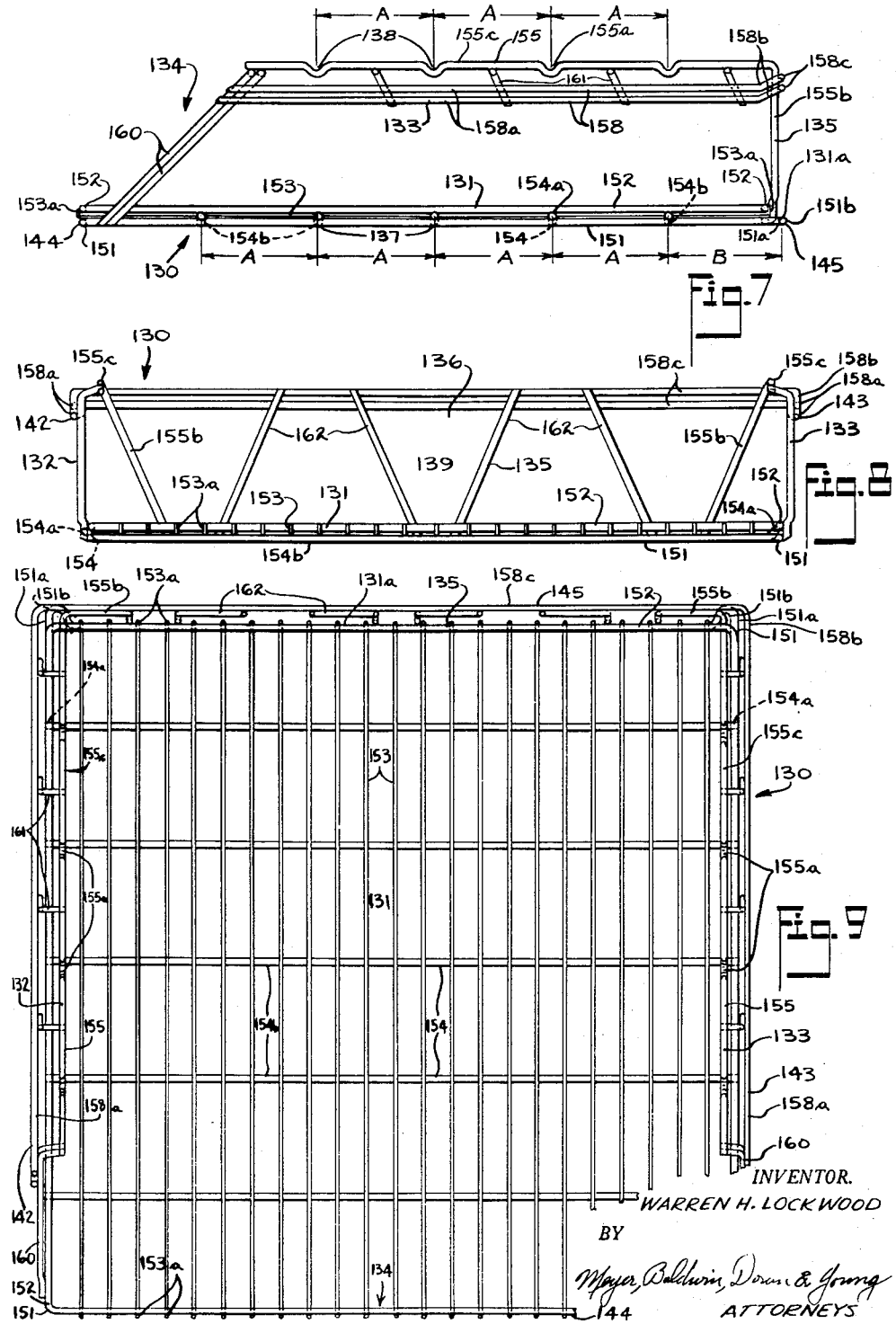

Oct. 10, 1961 W. H. LOCKWOOD 3,003,647
TIERABLE AND END-NESTABLE RECEPTACLES
Filed Aug. 3, 1960 13 Sheets-Sheet 3
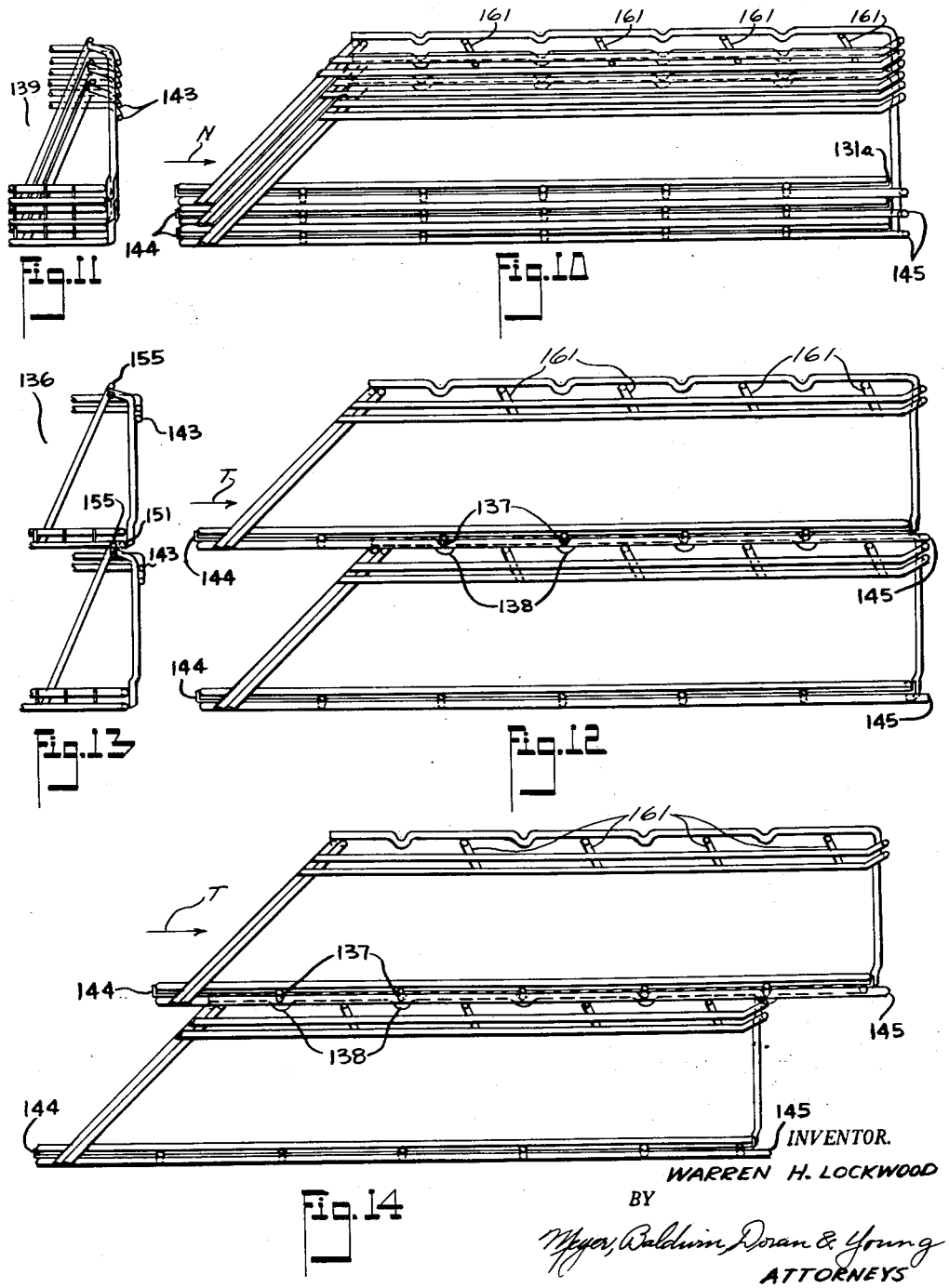
INVENTOR.
WARREN H. LOCKWOOD
BY
Myer, Baldwin, Doran & Young
ATTORNEYS

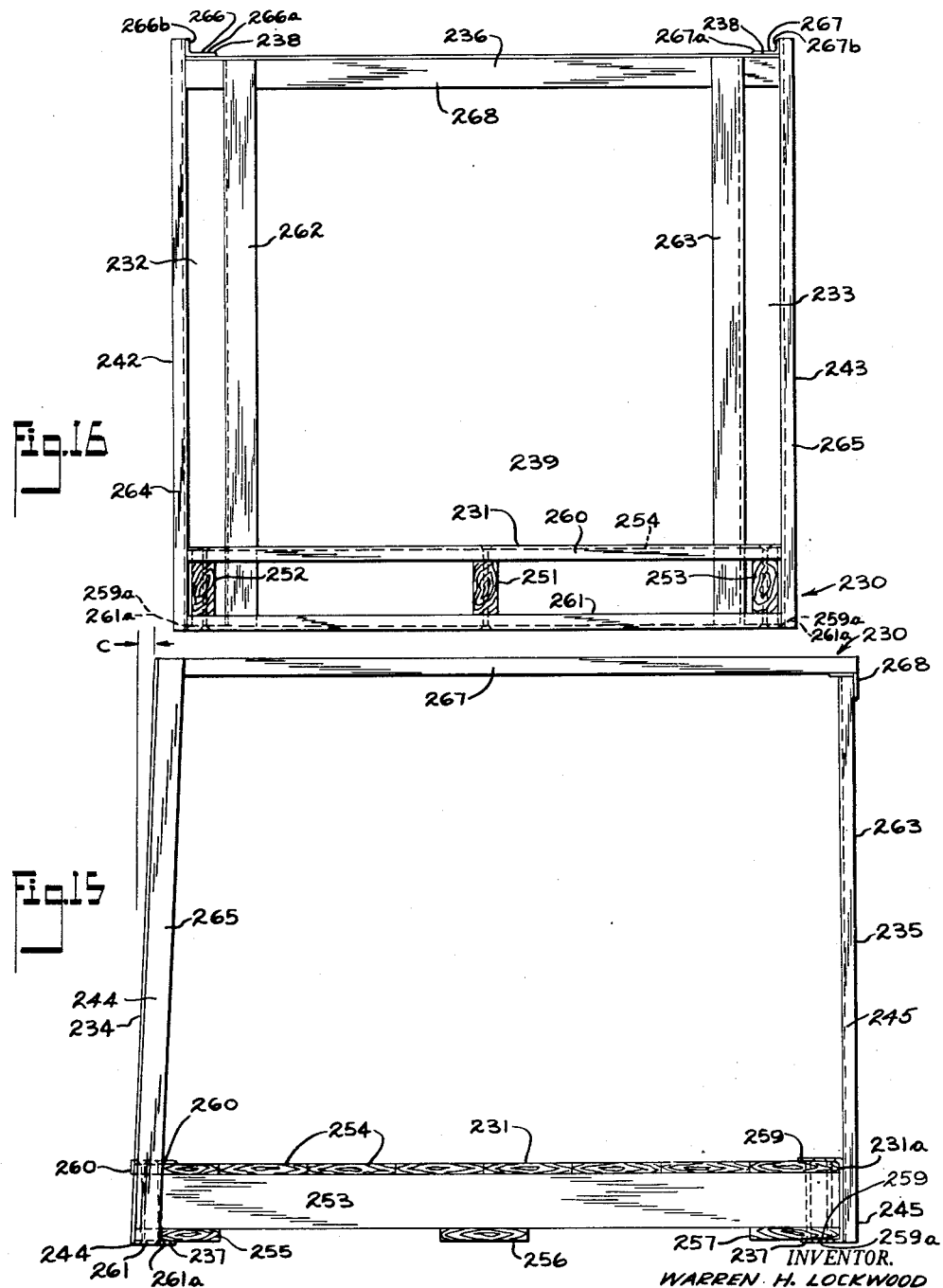

Oct. 10, 1961     W. H. LOCKWOOD     3,003,647
TIERABLE AND END-NESTABLE RECEPTACLES
Filed Aug. 3, 1960     13 Sheets-Sheet 5
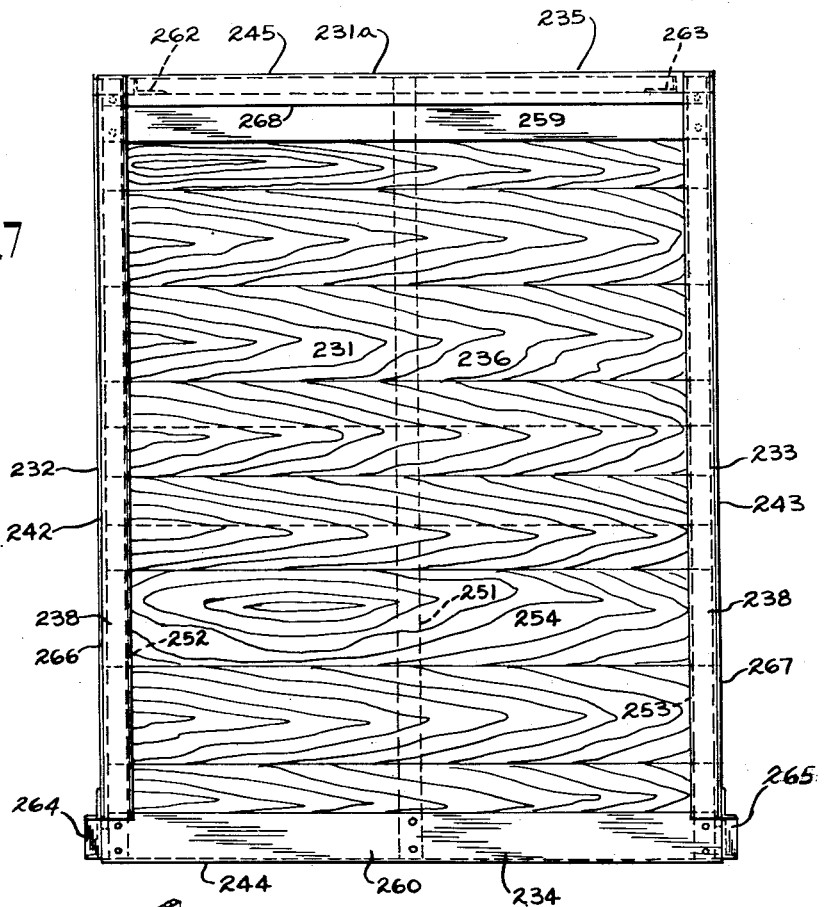
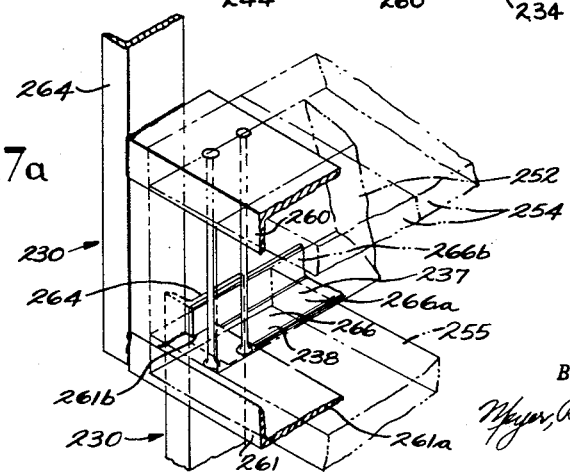
INVENTOR.
WARREN H. LOCKWOOD
BY
ATTORNEYS Oct. 10, 1961 W. H. LOCKWOOD 3,003,647
TIERABLE AND END-NESTABLE RECEPTACLES
Filed Aug. 3, 1960 13 Sheets-Sheet 6

INVENTOR.
WARREN H. LOCKWOOD
BY
ATTORNEYS

INVENTOR.
WARREN H. LOCKWOOD
BY
ATTORNEYS

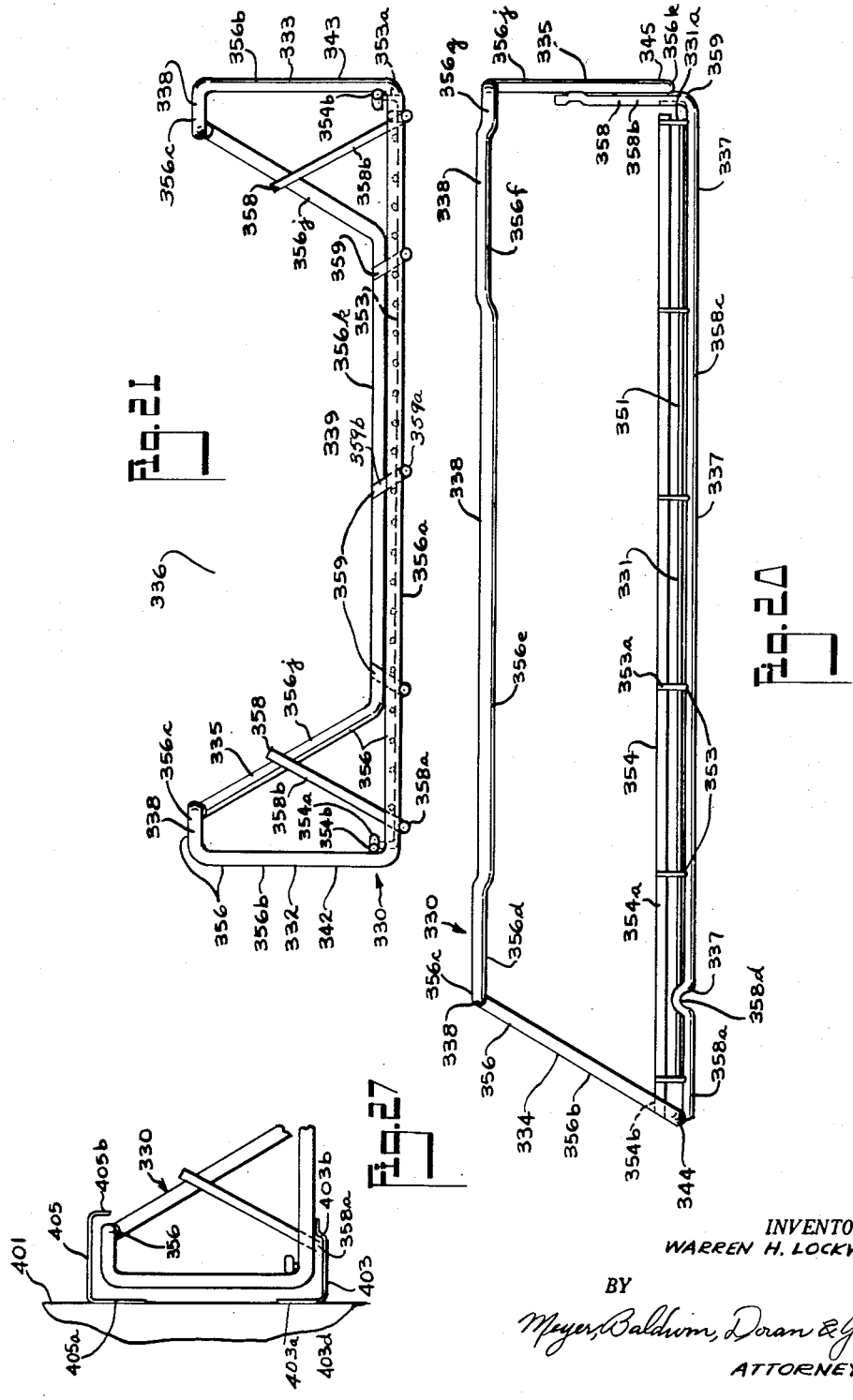

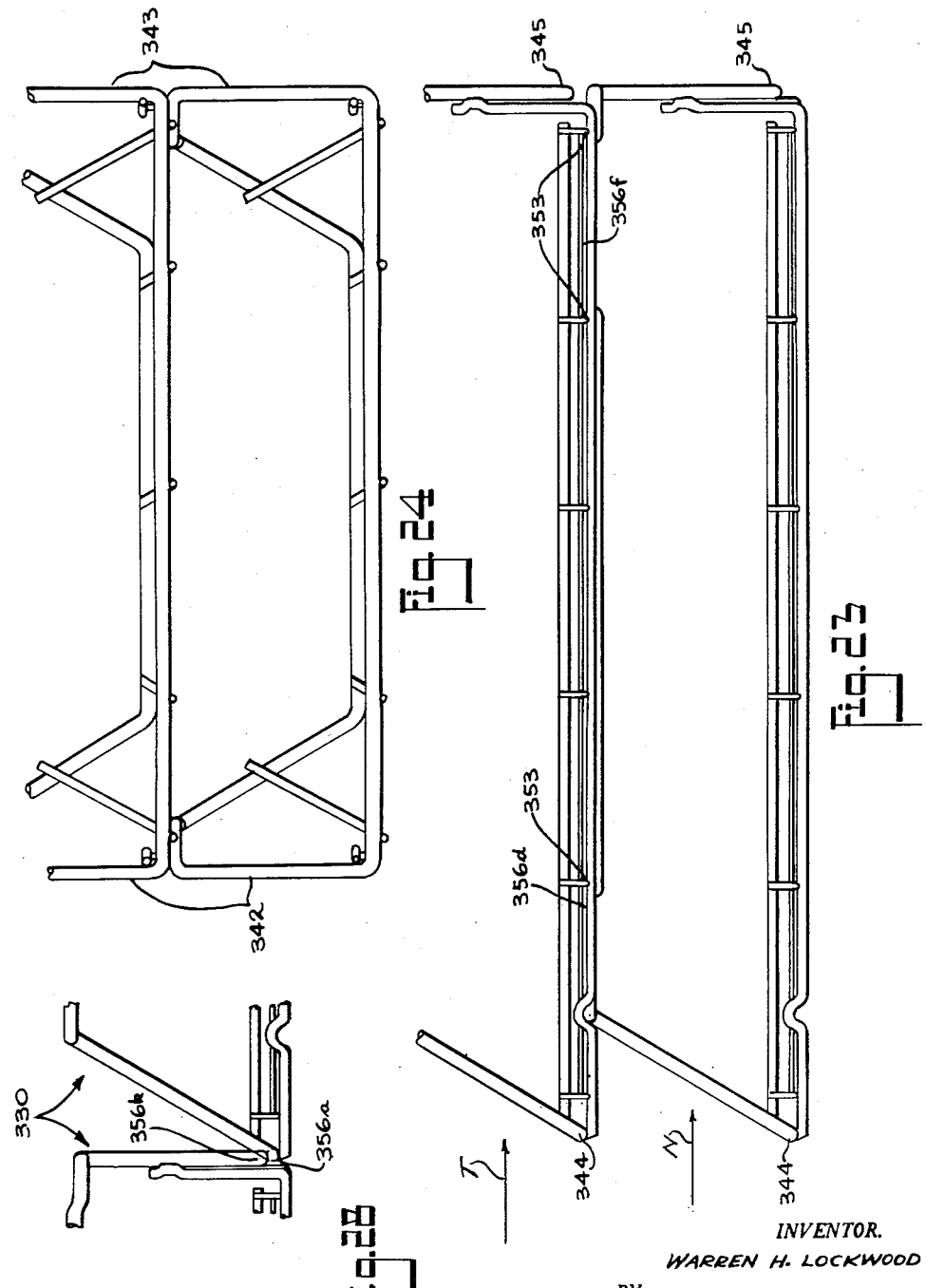

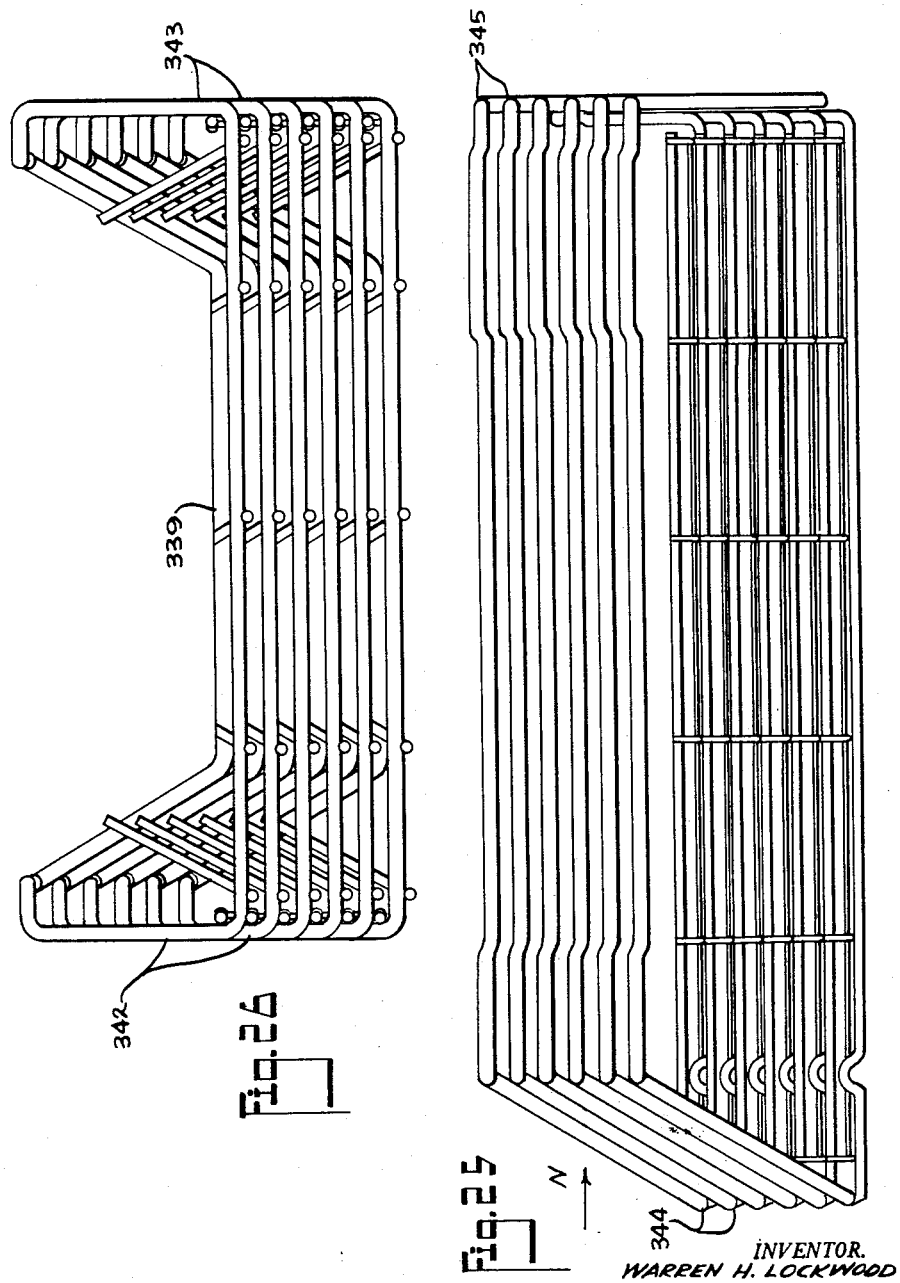

Oct. 10, 1961  W. H. LOCKWOOD  3,003,647
TIERABLE AND END-NESTABLE RECEPTACLES
Filed Aug. 3, 1960  13 Sheets-Sheet 12
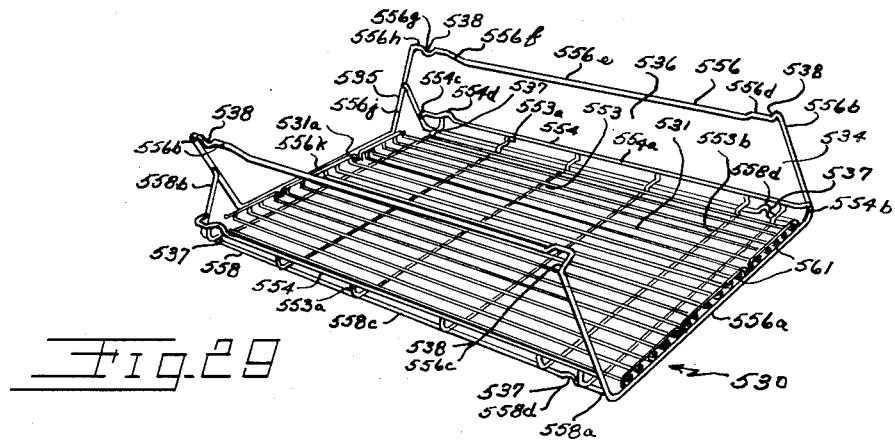
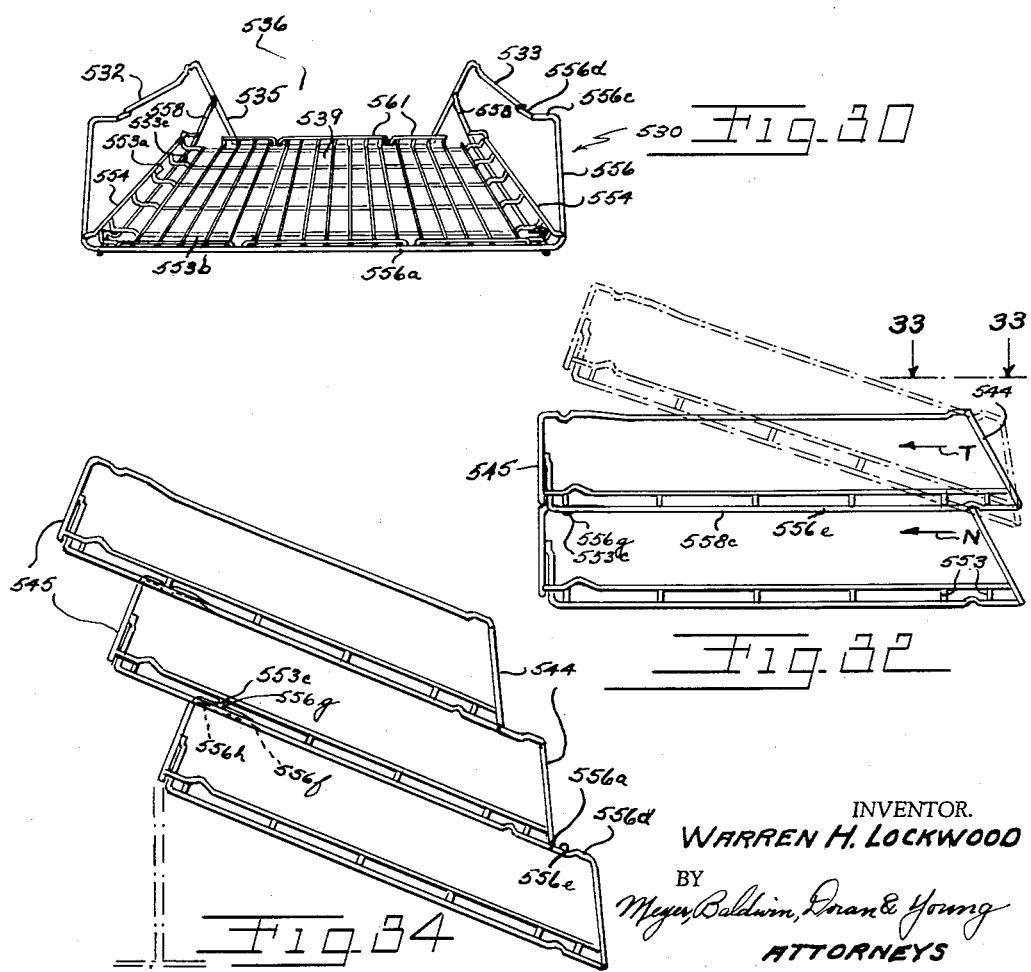
INVENTOR.
WARREN H. LOCKWOOD
BY
Meyer, Baldwin, Doan & Young
ATTORNEYS

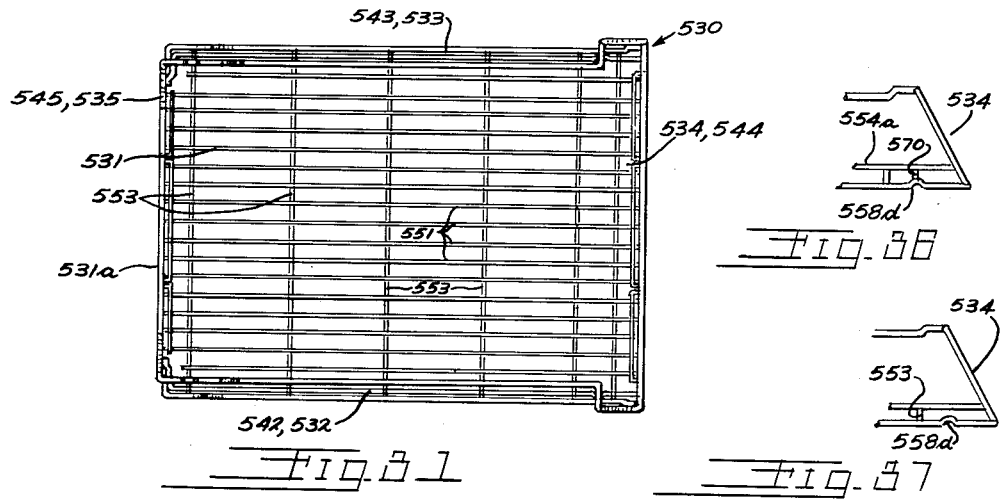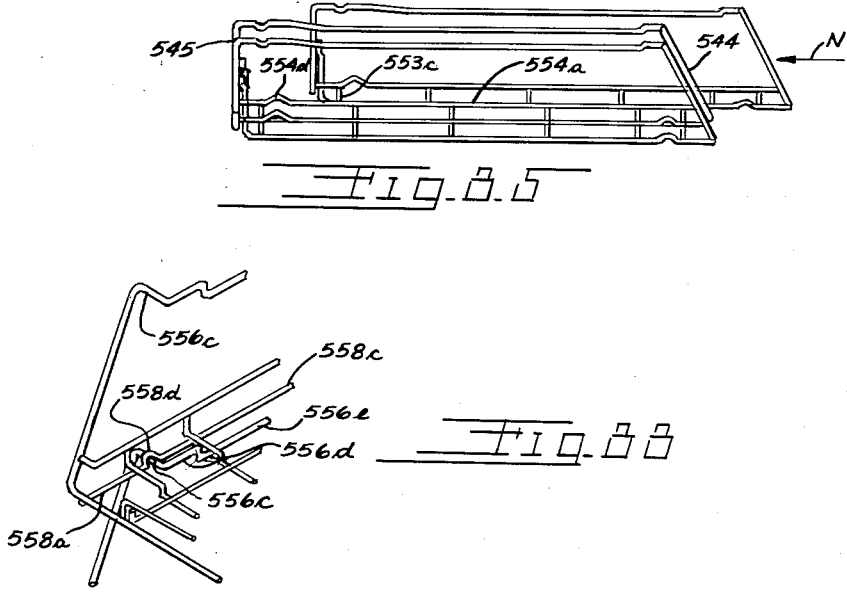

United States Patent Office 3,003,647
Patented Oct. 10, 1961

3,003,647
TIERABLE AND END-NESTABLE RECEPTACLES
Warren H. Lockwood, 1329 Granvia Altamira,
Palos Verdes Estates, Calif.
Filed Aug. 3, 1960, Ser. No. 47,220
49 Claims. (Cl. 211—126)

This invention relates to improvements in trays or receptacles, and more particularly to that type adapted to be tiered when in use and to be nested when empty.

This application is a continuation-in-part application of my copending United States patent application Serial No. 790,432, filed February 2, 1959, now abandoned, and entitled "Tierable and End-Nestable Receptacles."

Whenever in the specification and claims these trays or receptacles are referred to as "trays," it is intended that this term includes crates, boxes, baskets, trays, skids, pallets, flats, and similar receptacles or article carrying devices which may be stacked one upon another when in use and neshed when empty for conservation of space.

One of the objects of the present invention is to provide a tray adapted to be tiered with like trays and adapted to be end nested with like trays when empty to conserve space.

A further object of the present invention is to provide like trays adapted to be tiered with at least some of the opposite sides of the horizontal perimeter outlines of the trays respectively in either vertical alignment or in vertically stepped alignment.

A further object of the present invention is to provide like trays adapted to be end nested with at least some of the opposite sides of the horizontal perimeter outlines thereof in nested position vertically aligned or in vertically stepped alignment.

A further object of the present invention is to provide a tray characterized by its inexpensive manufacturing cost, ease of assembly of its component parts, structural simplicity, compactness in end nesting relationship with like trays, strong and sturdy nature, multiplicity of functional advantages, and/or ease of assembly with a like tray in either tiered or end nested relationship.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a perspective view of one form of tray taken from a point above and to one side of the tray;

FIG. 2 is a perspective view of the bottom of the tray in FIG. 1;

FIG. 3 is a perspective view of three trays of FIGS. 1 and 2 end nested and a fourth like tray entering the clearway of the other three trays as it is moved toward the right and toward end nested position;

FIG. 4 is a perspective view of four trays of the type shown in FIG. 1 in end nested position;

FIG. 4a is a front view of FIG. 4;

FIG. 4b is a front view of the first tray form in FIG. 4a but with a strip attached to each of its cleats to form corresponding cleats of greater vertical height so that each tray in FIG. 4a is a subcombination of each tray in FIG. 4b;

FIG. 4c is a vertical sectional view taken generally along the line 4c—4c in FIG. 4b showing an enlarged sectional view of this cleat construction;

FIG. 5 is a vertical sectional view of two like trays, as shown in FIG. 1, with these trays in one tiered position;

FIG. 6 is a vertical sectional view of the two like trays in FIG. 5 in another tiered position;

FIG. 7 is a side elevational view of a second tray form;

FIG. 8 is an elevational view of the back side portion of the tray in FIG. 7;

FIG. 9 is a top plan view of the second tray form of FIG. 7;

FIG. 10 is a side elevational view of three like trays of the second form in end nested position;

FIG. 11 is an end elevational view of the nested trays in FIG. 10 taken from the left-hand side of FIG. 10 looking toward the right;

FIG. 12 is a side elevational view of two like trays of the second form in one tiered position;

FIG. 13 is an end elevational view of the trays in FIG. 12 taken looking toward the right at the left end of the trays in FIG. 12;

FIG. 14 is a side elevational view of the two like trays in FIG. 12 in another tiered position;

FIG. 15 is a side elevational view of a third tray form;

FIG. 16 is a front elevatonal view of a tray of FIG. 15;

FIG. 17 is a top plan view of the tray of FIG. 15;

FIG. 17a is a perspective view of a section through the front lower edge looking at the left side of the two top tiered trays in FIG. 18;

FIG. 20 is a side elevational view of a fourth tray form;

FIG. 21 is a front elevational view of the tray of FIG. 20;

FIG. 23 is a side elevational view of two trays of the fourth tray form in tiered relationship;

FIG. 24 is a front elevational view of the trays of FIG. 23;

FIG. 25 is a side elevational view of six trays of the fourth tray form in end nested relationship;

FIG. 26 is a front elevational view of the trays of FIG. 25;

FIG. 27 is a side elevational view of a tray support adapted to support opposite sides of the fourth tray form of FIG. 21 but with only the left hand tray support shown in FIG. 27;

FIG. 28 is a side elevational view of the overlap of the back and front side portions of adjacent trays supported in end to end relationship by the structure of FIG. 27;

FIG. 29 is a perspective view of a fifth tray form;

FIG. 30 is a front perspective view of the tray of FIG. 29;

FIG. 31 is a top plan view of the tray of FIG. 29;

FIG. 32 is a side elevational view of two like trays of the fifth form shown in solid line in one tiered position and with the upper tray shown in dot-dash line position after being swung clockwise about the horizontal, transverse pivot axis at the top and front portion (at upper right end) of the lower tray;

FIG. 33 is a perspective view of a portion of the tiered trays in FIG. 32;

FIG. 34 is a side elevational view of three like trays of the fifth form shown in FIGS. 29 and 32 with these trays being shown in another tiered position and having the trays raised slightly in the rear by a suitable support for display purposes;

FIG. 35 is a side elevational view of three like trays of the fifth form in FIG. 29 with the lower two trays in end nested position and the upper tray entering the clearway of the other two trays and is being moved toward the left toward end nested position;

FIG. 36 is a side elevational view of a modified form of the tray construction at the lower right-hand portion of the lower tray in FIG. 32; while FIG. 37 is a side elevational view of a modified form of the tray construction at the lower right-hand portion of the lower tray in FIG. 32.

Figure 18:
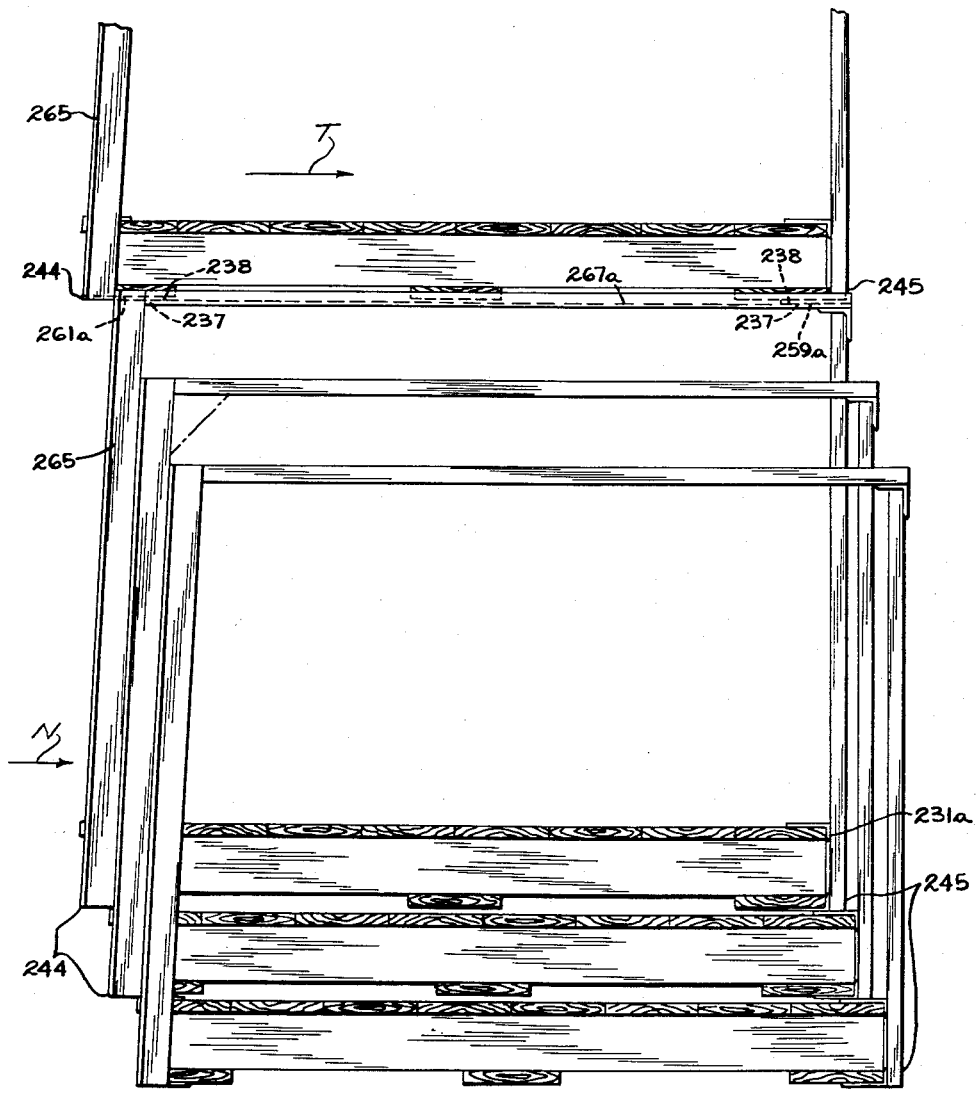
FIG. 18 is a side elevational view of four like trays of the third tray form of FIG. 15 with the lower three trays in end nested position and with the top two trays in tiered position.

Before the trays here illustrated are specifically described, it is to be understood that the invention here involved is not limited to the structural details or arrangement of parts here shown since trays embodying the present invention may take various forms. It also is to be understood that the phraseology or terminology herein employed is for purposes of description and not of limitation since the scope of the present invention is denoted by the appended claims.

Five major tray forms are shown with the first tray form in FIGS. 1–6, the second form in FIGS. 7–14, the third form in FIGS. 15–19, the fourth form in FIGS. 20–28, and the fifth form in FIGS. 29–37. All five forms have generic features in common. In each tray form, the tray has a bottom portion for supporting articles, has upper and lower tiering support portions for holding like trays in tray supporting tiered relationship, and has an open side portion forming the entrance to a horizontally extending clearway to receive like trays in a nested position by horizontally inserting said like trays through said open side portion and clearway by end nesting.

The first form of the invention is shown as tray 30 in FIGS. 1–6. This tray includes bottom portion 31, left side portion 32, right side portion 33, open end or open side portion 34, back side portion 35, and open top portion 36. The horizontal perimeter outline (outline of tray in top view) includes two opposite sides 42 and 43, and two additional opposite sides 44 and 45 (front and back) at 90 degrees to sides 42 and 43. To aid in describing hereinafter the tiering and end nesting operations, there has been designated, on tray 30, leading end 31a of bottom portion 31; lower tiering support portions or means 37 carried by bottom portion 31; upper tiering support portions or means 38 carried by some of the upwardly extending side portions 32, 33 and 35; and clearway 39 extending through open side portion 34, straddled by side portions 32 and 33 and extending to back portion 35.

Bottom portion 31 includes side members 52, 53 and 55 respectively secured together and secured to a bottom wall 54 composed of a solid panel or a plurality of board strips arranged in floor like formation.

A U-shape top member 58 is provided with a back portion 58a and parallel side portions 58b and 58c.

Tray side portions 32 and 33 include inclined front side strut 60 secured at opposite ends to member 52 and portion 58c; and strut 61 secured to member 53 and portion 58b.

Back side portion 35 includes inclined struts 62, 63, 64 and 65 each secured at opposite ends to portion 58a and member 55 with these struts in coplanar relationship to provide a flat back portion.

Lower tiering support portion 37 includes the bottom surface of panel member 54 in FIG. 2 and includes four spaced apart cleats 66, 67, 68 and 69 secured to the bottom surface of bottom portion 31 and arranged in two spaced apart parallel lines with one line formed by cleats 66 and 68 and the other line formed by cleats 67 and 69. The spaces 70 and 71 between the two cleats in each parallel line are equal in FIG. 2 and each of these distances is slightly greater than each of the equal dimensions 58d and 58e between parallel opposite surfaces on member 58 with which they coact during stacking or tiering of the trays, as shown in FIGS. 5 and 6 to prevent front to back movement of the top tray in FIGS. 5 and 6 and in the reverse direction in FIG. 6. The transverse dimension in FIG. 4a between the outer edges of these cleats in these two lines is slightly less than the transverse spacing between the inner sides of rail members 42 and 43 so as to slidably fit in the manner shown in FIGS. 5 and 6 to prevent relative lateral movement of tiered trays.

Although tray 30 may be made of any suitable material, a satisfactory tray is obtained when members 52, 53, 54, 55, 58, 60, 61, 62, 63, 64, 65, 66, 67, 68 and 69 are made of wood with these members secured together by suitable fastening means, such as screws.

FIG. 4a shows the trays in FIGS. 1–4 in a group nested stack, and FIG. 4b shows the trays in a continuously nested stack. Trays 30' in FIG. 4b are identical to trays 30 in FIGS. 1–4a except that the corresponding cleats in FIG. 4b, such as cleat 67' in FIG. 4b corresponding to cleat 67 in FIG. 4a and formed by strip 75 detachably secured to cleat 67 by two or more screws 76 shown in FIG. 4c, are of greater vertical height than cleats 66, 67, 68 and 69 of FIGS. 2 and 4a but all cleats in FIG. 4b are of the same height and formed by adding a similar strip. Hence, each tray 30 is merely a subcombination of tray 30' formed after removal of strips 75.

The second form of the invention is shown as tray 130 in FIGS. 7–14. This tray includes bottom portion 131, left side portion 132, right side portion 133, open end or open side portion 134, back side portion 135, and open top portion 136. The horizontal perimeter outlines include in tray top view two opposite sides 142 and 143, and two additional opposite sides 144 and 145 (front and back) related at 90 degrees to sides 142 and 143. To aid in describing hereinafter the tiering and end nesting operations, there has been designated, on tray 130, leading end 131a of bottom portion 131; lower tiering support portions or means 137 carried by bottom portion 131; upper tiering support portions or means 138 carried by some of the upwardly extending side portions 132, 133 and 135; and clearway 139 extending through open side portion 134, straddled by side portions 132 and 133 and extending to back portion 135.

Bottom portion 131 includes a generally square top frame 152 and a bottom frame 151 generally square in shape and corresponding to the square shape of frame 151 but having two rearwardly extending ears 151a at the top of FIG. 9. A plurality of spaced, longitudinally between these frames 151 and 152 with each bar 153 having its opposite ends turned up at 153a secured to the peripheral surface of frame 152, as shown in FIGS. 7 and 9. A plurality of tranversely extending bars 154 are arranged in spaced apart relationship with each having a straight middle portion 154b coplanar with frame 151 and having opposite ends 154a turned up, located between corresponding sides of frames 151 and 152, and secured to each of these frames.

Left and right side portions 132 and 133 and back side portion 135 include two symmetrical members 155 arranged one each on the left and right hand sides of the tray 130 and include two parallel members 158. Each member 155 has a horizontally extending top portion 155c having spaced apart notches or detents 155a therein and a back member portion 155b extending downwardly with its lower end secured to the back edges of frames 151 and 152. Spaced a little below top portions 155c are generally parallel U-shaped members 158 having four, left and right parallel side portions 158a extending parallel to top portions 155c are located threbelow, upwardly bent portion 158b at the rear of the tray, and then back portion 158c extending parallel to the plane of frames 151 and 152 and secured to back member portions 155b.

Left and right side portions 132 and 133 are completed on each side by two parallel inclined members 160 and 160 secured at spaced apart points to edges of frames 151 and 152, to members 158, and to portion 155c. Four parallel members 161 in each side portion 132 or 133 are secured to portions 158a and 155c to tie them together.

It should be readily apparent that in each side portion, parallel members 158 may be readily replaced by a single member and parallel members 160 may be readily replaced by a single member of sufficient size. The parallel member construction illustrated has been found desirable to give the satisfactory strength required.

Back side portion 135 is completed by inclined members 162 with each secured at its upper end to portions 158c and at its lower end to outer surface of frames 151 and 152.

Upper tiering support portion 138 has a plurality of detents 155a opening vertically upwardly away from bars 154 on the tray in FIG. 7 so as to straddle bars 154 on a tiered upper like tray, as shown in FIG. 12. Lower tiering support portions have a plurality of rod-like wire bar portions 154b of bars 154 and left and right side portions of frame 151. Detents 155a in portions 155c in both side portions 132 and 133 are transversely aligned along lines extending parallel to the transversely extending bar portions 154b. The coaction of bar portions 154b and detents 155a support like trays vertically and against front to rear movement. Parallel left and right side members of frame 151 in the upper tray straddle parallel portions 155c in the lower tray in FIG. 13 to prevent relative lateral movement between the tiered trays.

The trays are constructed for easy tiering engagement. The distance A in the horizontal direction between detents 155a in FIG. 7 and between bar portions 154b is equal so that tray tiering relationships in FIGS. 12 and 14 may be easily established. However, the distance B in FIG. 7 is different from, and preferably greater than, distance A. The distance B is the horizontal dimension between rod-like wire bar portion 151b on either ear 151a, which serves as one of the lower support portions, and the first bar portion 154b on the right in FIG. 7 so that this distance B is the distance between the two lower tiering support portions closest to the leading end 131a of bottom portion 131. As will be more apparent hereinafter when the method of tiering like trays 130 is described, this difference in distances A and B serves a useful function. If the upper tray 130 in FIG. 12 or 14 is disengaged and is located upwardly and to the left of the lower tray shown in these figures, the lower right end of the upper tray may be placed upon the parallel portions 155c of the lower tray, which serve as coplanar surfaces connecting the upper tiering support detents 155a. Then, if the lower right end of the upper tray is slid to the right in tiering direction T with its leading end 131a on portions 155c of the lower tray and into the tiered position shown in FIGS. 12 or 14, these two rod-like bar portions 151b and the first bar portion 154b located closest to the leading end 131a will not both engage simultaneously in spaced apart detents 155a to impede the travel in direction T to tiered position.

The component members, frames, bars and portions of tray 130 are made of wire and may be secured together in any suitable manner, but preferably by welding them together.

The third form of the invention is shown as tray 230 in FIGS. 15-19. This tray includes bottom portion 231, left side portion 232, right side portion 233, open end or open side portion 234, back side portion 235, and open top portion 236. The horizontal perimeter outlines includes in tray top view two opposite sides 242 and 243, and two additional opposite sides 244 and 245 (front and back) related at 90 degrees to sides 242 and 243. To aid in describing hereinafter the tiering and end nesting operations, there has been designated, on tray 230, leading end 231a of bottom portion 231; lower tiering support portions or means 237 carried by bottom portion 231; upper tiering support portions or means 238 carried by some of the upwardly extending side portions 232, 233 and 235; and clearway 239 extending through open side portion 234, straddled by side portions 232 and 233 and extending to back portion 235.

Bottom portion 231 includes three, spaced apart, longitudinally extending members 251, 252 and 253 in FIG. 16 having secured in bridging relationship to their upper surfaces a plurality of board members 254 to form a flat platform surface. It should be readily understood that a solid panel could be substituted in place of the plurality of board members 254. Transversely extending bottom members 255, 256 and 257 are spaced longitudinally apart and are secured to the longitudinal members 251, 252 and 253. A U-shaped metal strap member 259 is secured around the back end of this assembly and top and bottom L-shaped strap members 260 and 261 are secured at the front end of this assembly to the front end board member 254 and to bottom member 255 by through rivets or other suitable fastening means. Members 251, 252, 253, 254, 256 and 257 are wood members secured together in any suitable manner, and preferably by nails.

The aforesaid bottom portion 231 is easily made by the conversion of a conventional wood pallet or flat used for article handling and storage.

Left and right side portions 232 and 233 and back side portions 235 include interconnected angle irons secured together in any suitable manner, such as by welding. Here, two parallel back members 262 and 263 are welded or otherwise secured at their lower ends to strap member 259. Two parallel front members 264 and 265 are similarly secured to strap members 260 and 261. Two parallel top members 266 and 267 are secured respectively at their forward ends to front members 264 and 265 and are connected at their rear ends by back top member 268 secured in turn to the tops of back members 262 and 263. FIGS. 15 and 16 indicate the orientation of these members. Back members 262 and 263 extend vertically to, and top members 266 and 267 extend parallel to, the plane formed by the board members 254 while front members 264 and 265 are inclined in FIG. 15 slightly upwardly and to the rear of a perpendicular from this plane. The inclination to the perpendicular is shown by the dimension C in FIG. 15. Satisfactory results have been obtained when dimension C is two inches in a 39 inch length of member 264 or 265. In the offset nesting of FIG. 18, it is thus easier to arrange the front members 264 and 265 more nearly vertical.

Figure 19:
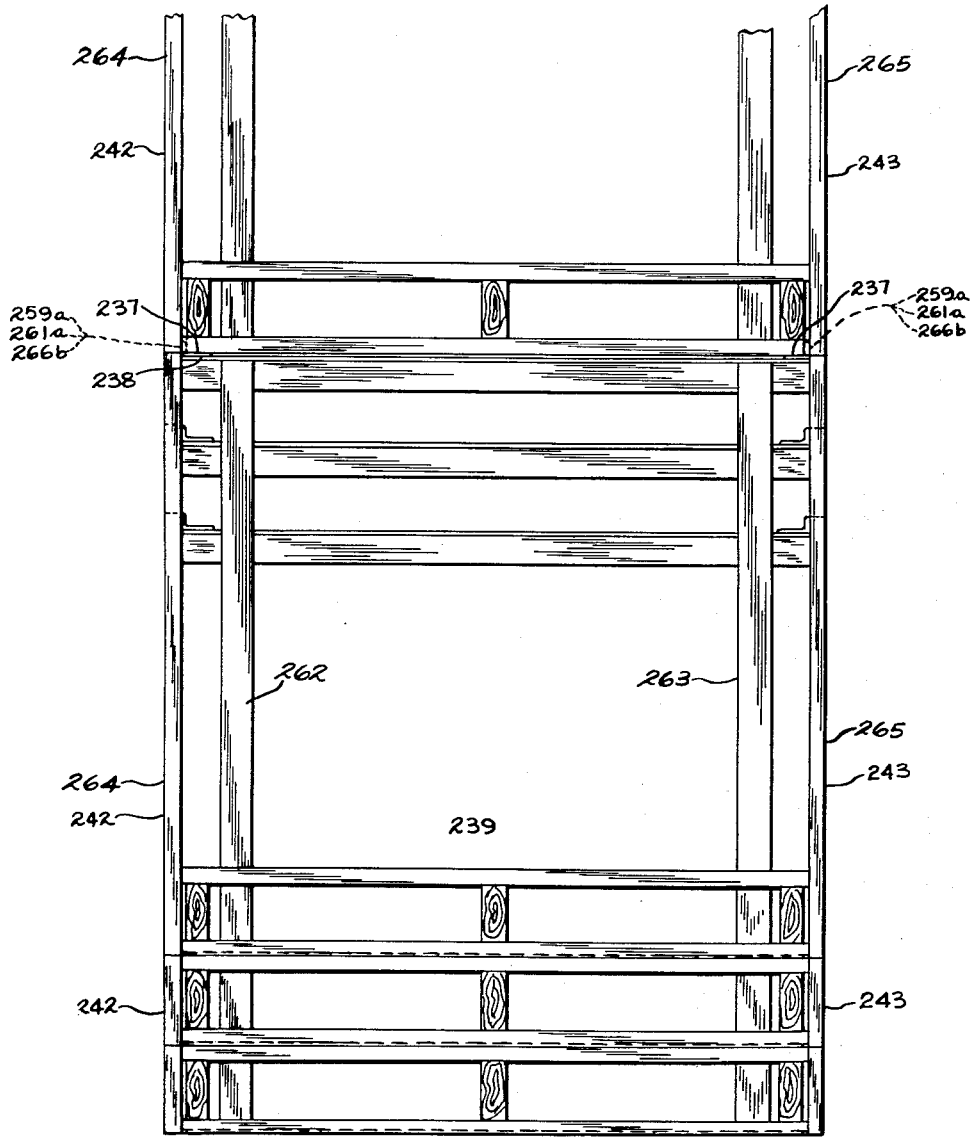
FIG. 19 is a front elevatioanl view of the four trays of FIG. 18.

Lower and upper tiering support portions 237 and 238 are clearly shown in FIGS. 15-19. Upper tiering support portions 238 include parallel flanged members 266 and 267 and members 264 and 265 at the top of the tray, and lower tiering support portions 237 include portions of strap members 259, 261, of bottom members 255, 256 and 257, and of the bottom of members 264 and 265. The top tray 230 in FIGS. 17a, 18 and 19 is supported vertically by horizontal extending flanges 266a and 267a of top members 266 and 267 located below and supporting vertically coplanar bottom strap portions 259a and 261a of straps 259 and 261. The transverse or lateral dimensions of the tray 230 are such that the left and right ends are respectively coplanar in FIG. 16 of members 252, 253, 255, 256, 257 and 259a and of notch 261b in member 261a behind member 264 in FIG. 17a so that these coplanar ends on the upper tray 230 will bear against side flange surfaces 266b and 267b of top members 266 and 267 on the lower tray 230 to assure these tiered like trays against lateral relative movement in FIG. 19. Bottom back edge of members 264 and 265 on the upper tray abuts in FIGS. 17a and 18 against the top front edge of members 264 and 265 on the lower tray to prevent front to back relative movement between the trays in at least one direction in tiered relationship.

The fourth form of the invention is shown as tray 330 in FIGS. 20-28. This tray includes bottom portion 331, left side portion 332, right side portion 333, open end or open side portion 334, back side portion 335, and open top portion 336. The horizontal perimeter outlines include in tray top view two opposite sides 342 and 343, and two additional opposite sides 344 and 345 (front and back) related at 90 degrees to sides 342 and 343. To aid in describing hereinafter the tiering and end nesting operations, there has been designated on tray 330 leading end 331a of bottom portion 331; lower tiering support portions or means 337 carried by bottom portion 331; upper tiering support portions or means 338 carried by some of the upwardly extending side portions 332, 333 and 335; and clearway 339 extending through open side portion 334, straddled by side portions 332 and 333 and extending to back portion 335.

Tray 330 is made of wire members secured together in any suitable manner with this securement preferably being by welding.

Figure 22:
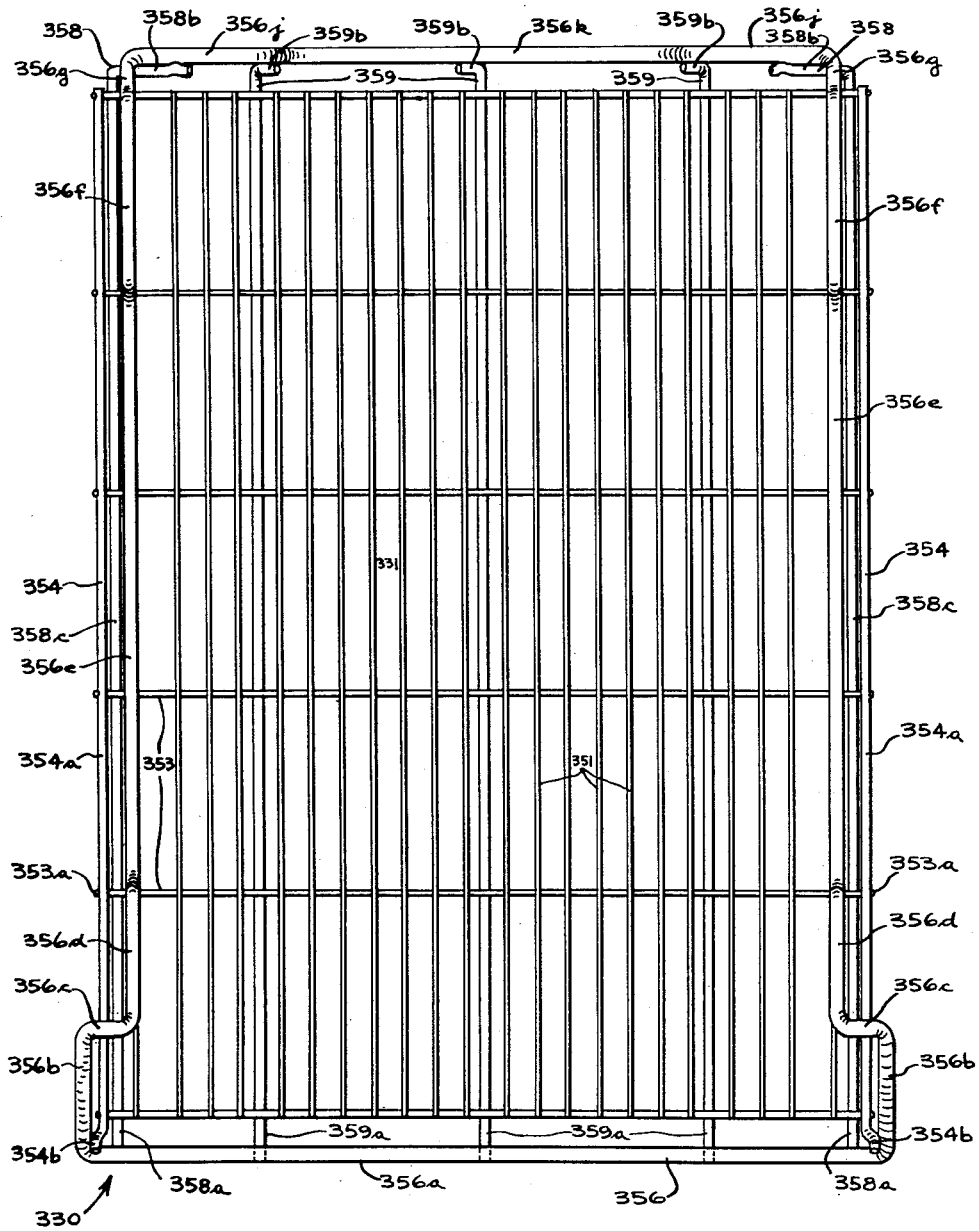
FIG. 22 is a top plan view of the tray of FIG. 20.

Bottom portion 331 has in FIGS. 20–22 a plurality of spaced apart longitudinally extending bar members 351 secured at their intersections to a plurality of spaced apart transversely extending bar members 353. Left and right side members 354 are provided and extend parallel in the longitudinal direction with each including a straight portion 354a and a bent front end 354b. Bar members 353 have opposite ends 353a upwardly bent and secured to straight portions 354a.

Bottom portion 331, left side portion 332, right side portion 333 and back side portion 335 have a plurality of interconnected wire members including members 354. An endless framing member 356, symmetrical about a vertical center line in FIG. 22, is bent in portions including a transversely extending front portion 356a; parallel inclined front edge portion 356b; transversely extending coaxial rod portion 356c, parallel longitudinally extending front side portions 356d, front depressed portion 356e, rear side portion 356f, and rear depressed portion 356g; diagonally extending rear portion 356j; and a transversely extending rear portion 356k extending parallel to front edge portion 356a. Bent ends 354b are secured to front edge portion 356b. Of the two members 358, each has longitudinally extending bottom portion 358a secured at its lower end in FIG. 22 to front edge portion 356a, a downwardly facing detent or notch 358d, a longitudinally extending rear bottom portion 358c, and an inclined back portion 358b. Of the three inside bottom members, 359, each has a longitudinally extending bottom portion 359a having its front end secured to edge portion 356a and having a back portion 359b. The upper ends of back portions 358b and 359b are secured to rear portions 356j and 356k respectively, as shown in FIG. 21. Longitudinally extending bottom portions 358a, 358c and 359a are secured to transversely extending bar members 353.

Lower and upper tiering support portions 337 and 338 are shown in FIGS. 20–24. These provide for like trays 330 vertical support, lateral support and prevention of front to rear thrust movement. These functions are provided by having the rod-like wire bar portions 356c of the lower tray straddled by detents 358d of the upper tray with this bar portion 356c being part of the upper tiering support portion 338, and detent 358d being part of the lower tiering support portion 337; rear longitudinally extending portion 358c on the upper tray straddling portions 356d, 356e, 356f and 356g of the lower tray; and bar members 353 in FIG. 23 straddling the right end of portion 356d and the opposite ends of portion 356f in FIGS. 20 and 23.

This continuous wire bar 356 forms by suitable bends the top boundaries (portions 356c, 356d, 356e, 356f and 356g) of the side parts; upwardly bent portions 356f, 356c and 356d in these top boundaries; bottom edges 356a and 356k of the bottom part; sloping ends 356b and 356j of the side parts. Eyelets are formed in the bottom part to receive the upwardly bent portions 356c, 356d and 356f in tiered position in FIGS. 23 and 24 with these eyelets being formed by bottom portions 358c, 353, 351 and 358d.

The fifth form of the invention is shown as tray 530 in FIGS. 29–37. This tray includes bottom portion 531, left side portion 532, right side portion 533, open end or open side portion 534, back side portion 535, and open top portion 536. The horizontal perimeter outlines include in tray top view two opposite sides 542 and 543, and two additional opposite sides 544 and 545 (front and back) related at 90 degrees to sides 542 and 543. To aid in describing hereinafter the tiering and end nesting operations, there has been designated on tray 530 leading end 531a of bottom portion 531; lower tiering support portions or means 537 carried by bottom portion 531; upper tiering support portions or means 538 carried by some of the upwardly extending side portions 532, 533 and 535; and clearway 539 extending through open side portion 534, straddled by side portions 532 and 533 and extending to back portion 535.

Tray 530 is made of wire members secured together in any suitable manner with this securement preferably being by welding.

Bottom portion 531 has in FIGS. 29–31 a plurality of spaced apart longitudinally extending bar members 551 secured at their intersections to a plurality of spaced apart transversely extending bar members 553. Left and right side members 554 are provided and extend parallel in the longitudinal direction with each including a straight portion 554a having bend 554d therein, a bent front end 554b, and bent rear end portion 554c. Each member 553 has opposite ends 553a upwardly bent and secured to straight portions 554a, straight portion 553b, and offset bar members or portions 553c between each end 553a and center or straight portion 553b.

A plurality of retainers 561, each of inverted generally U or L shape, has their ends rigidly secured by welding to bar portion 556a or 556k to be rigid with bottom portion 531.

Trays 530 may take several slightly different forms identical in structure except for the following slight variations: (1) two bar members 553 straddling detents 558d in the form shown at right-hand end in FIG. 29, (2) a vertically extending connecting bar 570 for each detent 558d in FIG. 36 with each bar 570 welded at its respective top and bottom ends to detent 558d and portion 554a, or (3) a bar 553 to the left of detent 558d in FIG. 37 but no bar 553 to the right of detent 558d.

Bottom portion 531, left side portion 532, right side portion 533 and back side portion 535 have a plurality of interconnected wire members, including members 554. An endless framing member 556, symmetrical about a horizontal center line in FIG. 31, is bent in portions including a transversely extending front portion 556a; parallel inclined front edge portion 556b; transversely extending coaxial rod portion 556c, parallel longitudinally extending front side portions 556e, front bent portion 556d, rear inclined side portion 556f, and rear notch portion 556g in horizontal portion 556h; diagonally extending rear portion 556j; and a transversely extending rear portion 556k extending parallel to front edge portion 556a. Bent ends 554b are secured to front edge portion 556b. Of the two members 558, each has longitudinally extending bottom portion 558a secured at its front end in FIG. 29 to front edge portion 556a, a downwardly facing detent or notch 558d, a longitudinally extending rear bottom portion 558c, and an inclined back portion 558b. The rear ends of portions 553b and 554c are secured to rear portions 556j and 558b respectively, as shown in FIG. 29. Longitudinally extending bottom portions 558a and 558c are secured to transversely extending bar members 553.

Lower and upper tiering support portions 537 and 538 are shown in FIGS. 29 and 30. These provide for like trays 530 vertical support, lateral support and prevention of front to rear thrust movement. In one tiering position (in FIGS. 32 and 33), these functions are provided by having the rod-like wire bar portions 556c of the lower tray straddled by detents 558d of the upper tray with each bar portion 556c being part of upper tiering support portion 538, and with each detent 558d being part of lower tiering support portion 537; rear longitudinally extending portion 558c on the upper tray straddling portions 556d, 556e, 556f and 556h on the lower tray; and bar members 553c on the bar member 553 (closest portion 556k) resting in notch portions 556g in FIG. 32. In another tiering position (in FIG. 34), these functions are provided by having bar portions 556e (adjacent portions 556d) of the lower tray supporting bar portion 556a of the upper tray with these portions being respectively parts of the upper tiering support portion 538 and the lower tiering support portion 537; rear longitudinally extending portions 558c on the upper tray straddling portions 556e, 556f and 556h of the lower tray; and bar members 553c on one of the other bar members 553 of the upper tray resting in notch portions 556g of the lower tray in FIG. 34.

FIGS. 27 and 28 show tray 330 mounted in vertical slides in a delivery truck. Two parallel, vertically extending, horizontally spaced apart stanchions 401 may be mounted in the truck body (only one being shown in FIG. 27 with this shown as engaging the left side of tray 330 in FIG. 21 because the vertical stanchion for supporting the right side of the tray in FIG. 21 is the mirror image of the one shown in FIG. 27). These stanchions have two horizontally aligned lower angle slides 403 and two horizontally aligned upper angle slides 405 for each tray 330 with these four slides arranged in groups, as shown in FIG. 27, to support a tray 330. Additional groups of these slides may be arranged in vertically spaced relationship on the vertical stanchions 401 to slidably support additional trays in vertical alignment. Each slide 403 or 405 has a uniform cross section throughout its length and its length is substantially equal to the length of any integral number of trays 330, such as one, two, etc. to be supported. Each slide is made of perforated rolled edge strip stock for cleanliness and light weight. These slides 403 and 405 have respectively mounting flanges 403a and 405a for securement to the vertical stanchions 401 and retaining flanges 403b and 405b for coacting in a retaining manner with longitudinally extending members or portions 358a and 358c and with members or portions 356d, 356e, 356f and 356g.

The other tray forms in FIGS. 1 to 19 and 29–37 have similar members or portions adapted to coact in a similar manner with retaining flange 403b and/or 405b. For example, see cleats 66, 67, 68 and 69 in FIG. 2; portions 151 and 155c in FIGS. 7 and 8; flange faces 266b and 267b in FIG. 16; and portions 558a, 558c, 556d, 556e, 556f and 556h in FIGS. 29–31.

When two or more trays are in abutting back to front relationship between one group of lower and upper slides 403 and 405, the trays 330 will have the back and front side portions overlapped to minimize the front to back overall dimension, as shown in FIG. 28, because front edge portion 356a of one tray may be located under the rear portion 356k of another tray since they are vertically spaced apart and portion 356k is of shorter transverse length, as shown in FIG. 21.

All of these four forms of trays 30, 130, 230, 330 and 530 have in common generic structural and operational features. Each is a tierable and end-nestable tray having no moving parts but being of rigid construction. Each could be made of angle iron, angle iron and wood, metal wire, aluminum, magnesium, cast aluminum, sheet metal, plastic, or any other material or construction embodying the principles set forth herein. The side portions and bottom portion of each tray may be substantially solid or of open construction, as desired, or the invention may be applied to trays having almost no side portions except for sufficient structure to rigidly connect the bottom with the upper tiering support portions in proper location. Each tray may be used as a warehouse pallet since the trays would remove the weight from the merchandise stored therein when tiered and since the nesting and tiering can be effected while the pallet is in a horizontal position parallel to the floor. Each tray may be made in dimensional multiples which would fit in the inside width of trucks in even multiples with minimum wasted space. Each tray may be used as a warehouse shelf in a warehouse, an order makeup rack, shipping rack in a transport truck, inventory storage rack in the back room of a super market, and/or a display rack in a sales area.

Trays 30, 130, 230, 330 and 530 have generic structure respectively comprising tray boundary means including bottom means, parts or portions 31, 131, 231, 331 and 531 for supporting articles for display, transport or storage with said bottom portion rigidly interconnected with left side parts or portions 32, 132, 232, 332 and 532; right side parts or portions 33, 133, 233, 333 and 533; and back side portions 35, 135, 235, 335 and 535 serving as upwardly extending means leaving front open end sides 34, 134, 234, 334 and 534 located most remote from the back side portions. In top view, the trays have horizontal perimeter outlines with two generally parallel opposite sides 42 and 43, 142 and 143, 242 and 243, 342 and 343, and 542 and 543 and have right-angularly related to these two recited opposite sides two additional opposite sides 44 and 45, 144 and 145, 244 and 245, 344 and 345, and 544 and 545. The trays include adjacent their top edges a plurality of upper tiering support portions 38, 138, 238, 338 and 538 vertically spaced above lower tiering support portions 37, 137, 237, 337 and 537 for holding like trays in tray supporting tiered relationship.

Trays 30, 130, 230, 330 and 530 are adapted to be tiered and end-nested with their respective like trays, as shown by the tiered positions in FIGS. 5 and 6, 12 and 14, the upper two trays in FIGS. 18 and 19, FIGS. 23 and 24, and FIGS. 32, 33 and 34; and by the end-nested relationships shown in FIGS. 3 and 4, 10 and 11, by the three lower trays in FIGS. 18 and 19, and by the trays in FIGS. 25 and 26 and in FIG. 35. These trays may be end-nested and/or stacked or tiered with a conventional fork lift truck since the nesting and stacking can be effected while the bottom portions 31, 131, 231, 331 and 531 are in horizontal position parallel to the floor while supporting articles and do not have to be tilted, and since the open tops 36, 136, 236, 336 and 536 provide clearance for any tray engagement member on the lift truck between vertically spaced bottom portions. Tray tiering is performed by moving from a tray disconnected position an upper like tray relative to a lower like tray through a vertically lowering movement onto (or by a horizontal sliding movement in tiering direction T across) the top of the lower tray into tiered position or relationship. If a top tray slides in direction T across a lower like tray, leading end 31a, 131a, 231a, 331a or 531a of the upper tray advances foremost. This tray tiered relationship may be disassembled and the upper tray may be moved into end-nesting relationship with the lower tray by moving the upper tray either horizontally in the reverse direction, with or without vertical upward movement, into a tray disconnected position with leading end 31a, 131a, 231a, 331a or 531a of the upper tray above and laterally outwardly from open side 34, 134, 234, 334 or 534 at the entrance to clearway 39, 139, 239, 339 or 539; moving the upper tray downwardly by a vertical lowering movement until the bottom portions of the trays are generally parallel with the bottom portion of the upper tray being uppermost; moving horizontally endwise the bottom portion 31, 131, 231, 331 or 531 of the upper tray, with leading end 31a, 131a, 231a, 331a or 531a foremost, horizontally endwise from tray disconnected position to one side of the lower tray in longitudinal nesting direction N parallel to the bottom of the lower tray through the open side and through this clearway to an "in position" located vertically between the upper and lower support portions;

and then permitting this bottom portion to be released from this in position to assume the tray nested position with the lower tray, as shown in FIGS. 4 and 10, the lower portions of FIGS. 18 and 19, FIGS. 25 and 26, and FIG. 35. This movement in direction N to "in position" and then release thereat may take either of two forms. First, the bottom portion of the upper tray may be spaced well above and out of contact with the bottom portion of the lower tray during movement in nesting direction N to this "in position" and then may be released to fall by gravity to the nested position. Second, the bottom portion of the upper tray may slide across the bottom portion of the lower tray in direction N and then release in the "in position" to assume the nested position. Note that end-nesting is effected without any necessity of lifting the upper tray up and over the lower tray to a nesting position. Since stacking or tiering and end-nesting are effected by horizontal and/or vertical movements, a conventional lift truck can be used to perform all operations.

Now, it should be apparent that an upper tray may be moved in sliding contact with a lower like tray from above the bottom portion and outside the open side of the lower like tray by movement in a generally horizontal direction T or N (with sliding contact of suitable guide means on these like trays) into tiering or nesting position respectively. Each of these tray forms has suitable guide means (including longitudinally extending portions interengageable on vertically adjacent trays) to define the path of this generally horizontal movement T or N and to prevent substantial lateral relative movement of the trays with respect to this path. This guide means includes a guide rail extending smoothly on one of the trays from contiguous open side 34, 134, 234, 334 or 534 in direction N or P for smoothly guiding the movement of the upper tray until at least shortly before the tiered or nested position is reached. These longitudinally extending portions and guide rails include during movement in direction T: (1) in FIGS. 1, 2, 5 and 6, portions 54, 66, 67, 68 and 69 on the upper tray, portions 58b and 58c on the lower tray, and guide rails 58b and 58c on the upper tray; (2) in FIGS. 7, 8, 12 and 13, portions 151 and 154 on the upper tray, portions 155 and 155c on the lower tray, and guide rails 155c; (3) in FIGS. 16–19, portions 252, 253, 255, 256, 257, 259a and 261a on the upper tray, portions 266a, 266b, 267a and 267b on the lower tray, and guide rails 266a and 266b; (4) in FIGS. 20–26, portions 353, 358a and 358c on the upper tray, portions 356d, 356e, 356f and 356g on the lower tray, and guide rails 356d and 356e; and (5) in FIGS. 29–35, portions 553c, 558b (lower ends) and 558c on the upper tray, portions 556c, 556d, 556e and 556f on the lower tray, and guide rails 556e. During movement into the nested position in direction N, these longitudinally extending portions and guide rails include: (1) in FIGS. 1, 2, 4a and 4b, portions 66, 67, 67', 68 and 69 on the upper tray, portions 52, 53 and 54 on the lower tray, and guide rails 52, 53 and 54; (2) in FIGS. 7–11, portions 151 and 154b on the upper tray, portions 152 and 160 on the lower tray, and guide rails 152; (3) in FIGS. 16–19, portions 259 and 261 on the upper tray, portions 254, 259, 260, 264, 265, etc. on the lower tray, and guide rails 254 and 260; (4) in FIGS. 20–26, portions 354, 358a and 358c on the upper tray, portions 354, 354a and 356b on the lower tray, and guide rails 354; and (5) in FIGS. 29–31 and 35, portions 553c, 558a and 558c on the upper tray, portions 554a and 556b on the lower tray, and guide rails 554a.

In trays 130, 230, 330 and 530, not only the bottoms (as described in the preceding paragraph) but also the tops of each upper tray is guided into nested position by suitable guides located at top of each side portion, as well as those previously described as located at the bottom of each side portion. In FIGS. 8 and 11, portions 155b on an upper tray are guided by portions 155c of a lower tray; in FIGS. 16 and 19, portions 262 and 263 on an upper tray are guided by portions 266a and 267a of a lower tray; in FIGS. 21 and 26, portions 356j on an upper tray are guided by portions 356d, 356e, 356f and 356g on a lower tray; and in FIGS. 30 and 35, portions 556j on an upper tray are guided on portions 556d, 556e, 556f, 556g and 556h on a lower tray.

The guides mentioned in the preceding paragraphs provide a desirable feature in all tray forms. During movement in direction N into nested position, each lower tray has its bottom portion vertically supporting and its side portions straddling and laterally guiding an upper like tray during movement through its clearway into nested position so that the tray user is provided with a guided action or "feel for nesting" while end nesting these trays.

Also, an inspection of FIGS. 29, 30 and 32 will reveal that the offset portions 553c located at opposite ends of each transverse bar member 553 in the upper tray, will generally clear during movement in direction T the upwardly extending bumps in bends 556d on the front end of the bottom tray to minimize interference with travel in direction T.

After smoothly traveling along the guide rail in direction T or N, the upper tray 330 or 530 will be cammed into locked and tiered or nested position by suitable interlocking of its lock portions. Movement of trays 530 will be first discussed. During movement of tray 530 in FIG. 32 in direction T toward tiered position, bar portion 553c on opposite ends of the left-hand bar 553 in FIG. 29 of the upper tray travels on guide rails 556e on the lower tray, are cammed upwardly by camming surfaces 556f and are dropped as first lock portions downwardly into upwardly opening U-shaped detents 556g as second lock portions in the tiered position. Simultaneously, detents 558d on the upper tray move downwardly over and interlock with bar portions 556c on the lower tray, located contiguous to the open sides 534 of the trays. The actions occur by a simultaneous downward movement of all corners of the upper tray. When upper tray 530 is being moved in direction N in FIG. 35 toward nested position, transversely extending bar portions 553c on the leftmost bar 553 in FIG. 29 on the upper tray are traveling on guide rails 554a of the tray therebelow. Then, these portions 553c engage camming surfaces of humps 554d to cam the upper tray upwardly and to drop these first lock portions 553c downwardly behind second lock portions (including the left-hand surface of hump 554d in FIG. 35) into nested position to lock the trays in this nested position. Note that during the movement of the upper tray in direction N, this upper tray moves smoothly over rails 554a on the lower tray and does not encounter any camming action or travel interfering bump until bumps 554d are engaged just before the nested position is reached.

Trays 330 in FIGS. 20—24 have a similar action. Upper tray 330 may also be moved smoothly into and then locked in tiered position. During movement in direction T, the rightmost bar 353 on the upper tray in FIG. 20 slides smoothly over the guide rail portions 356d and 356e in FIG. 20 on the upper tray, and is cammed upwardly by surface 356f. Then, the two rightmost bars 353 on the upper tray in FIG. 23 drop downwardly as first lock portions into telescoping relationship with the spaced apart end portions of bends 356f on the lower tray acting as second lock portions on the lower tray to reach the locked and tiered position. In this tiered position, endwise movement of the upper tray in the plane of the drawing in FIG. 23 is prevented by the two parallel bar portions 353 on the upper tray straddling the upwardly converging portions on opposite ends of portions 356f on the lower tray, and sidewise movement is prevented by having in straddling relationship parallel bar portions 358c on the upper tray and center portions of bends 356f on the lower tray as straddling stop portions.

Now, it should be apparent that upper tray 330 in moving in direction T in FIG. 23 and upper tray 530 in moving in direction T in FIG. 32 or in direction N in FIG. 35 each include first lock portions (taking the form of a bar 353 or 553 extending transverse to the direction, located below the load supporting surface of the bottom portion, and contiguous to the leading end) for engaging the camming surface 356f, 556f or 554d on the approach side of the tiered or nested position during movement in this direction so that the upper tray is cammed upwardly, and then the first lock portions or bar are dropped downwardly into locking relationship with at least a portion of the second locking portions 356f, 556g or 554d (taking the form of an upwardly or downwardly projecting loop) on the lower tray to lock the trays in the final nested or tiered position. This structure serves as a latching means to prevent movement of the upper tray in a direction opposite to direction N or T.

In some tray forms, the upper tray in tiered position is locked against relative movement in all directions in a horizontal plane by interengagement of suitable lock means. This is true of tray 30 in FIG. 6, tray 130 in FIGS. 12 or 14, tray 330 in FIG. 23, and tray 530 in FIG. 32. This interengageable lock means includes portions 66, 67, 68, 69, 58a, 58b and 58c in FIGS. 1, 2 and 6; portions 151, 155, 154 and 155a in FIGS. 7, 8, 9, 12, 13 and 14; portions 353, 356c, 356f, 356d, 358c and 358d in FIGS. 20–23; and portions 558c, 553c, 558d, 556c, 556d, 556e, 556f, 556g and 556h in FIGS. 29–34.

In each of the four tray forms illustrated, the upper and lower tiering support portions on like trays mutually engage, hold and support an upper like tray firmly and evenly in tray supporting tiered position with opposite sides 42 and 43, 142 and 143, 242 and 243, 342 and 343, or 542 and 543 in vertical alignment with the open ends 34, 134, 223, 334 or 534 facing in suitable directions for display and access purposes. This tiered position may either have the additional horizontal perimeter opposite sides in vertical alignment, as shown by sides 44 and 45 in FIG. 5, 144 and 145 in FIG. 12, 244 and 245 on the upper two trays in FIG. 18, 344 and 345 in FIG. 23, or 544 and 545 in FIG. 32; or in vertically stepped alignment, as shown by opposite sides 44 and 45 in FIG. 6, opposite sides 144 and 145 in FIG. 14, or opposite sides 544 and 545 in FIG. 34 depending upon which group of upper and lower support portions are mutually engaged. Open front side portions 34, 134, 234, 334 and 534 in like trays may face the same direction as illustrated in the drawings for displaying the article supported on the bottom portions with these open sides either in vertical relationship, as shown in FIGS. 5 and 12, the upper two trays of FIG. 18, FIG. 23 or FIG. 32; or may be in stepped relationship, as shown in FIGS. 6, 14 or 34. Also if desired in each of the trays illustrated, the upper tray may be reversed 180 degrees in a horizontal plane with respect to the lower tray and then placed in tiering relationship on top of the lower tray so that the open end side 34, 134, 234, 334 or 534 in vertically arranged like trays will face in opposite directions in FIGS. 5 and 6, FIGS. 12 and 14, and the upper two trays of FIG. 18, FIG. 23 and FIG. 32.

In the tiered position, many of the tray forms have additional advantages. First, the top sides of trays 130, 330 and 530 are prevented from springing laterally. Each tray has top lock means and bottom lock means located respectively at the top (rigid with the top of the side portions) and bottom of each tray, and dimensioned so that the bottom lock means of one tray straddles the top lock means of an adjacent lower like tray in tiered relationship to prevent, as a rigid brace at both the front and rear ends of each tray (at each of the four corners), lateral springing of the tops or upper edges of the side portions on each lower tray. Note that portions 151 on an upper tiered tray will straddle portions 155 on a lower tray in FIG. 13 to prevent lateral springing of the top of the tray sides; portions 358a and 358c on an upper tray will straddle portions 356d, 356e and 356f on a lower tray in FIGS. 20–24; and portions 558c and 558d on an upper tray will straddle portions 556d, 556e, 556f, 556g and 556h on a lower tray in FIGS. 29–34.

Second, articles on the bottom portion of an upper tray may be better displayed by pivotally raising the rear end of the upper tray, as shown in the dot-dash line position in FIG. 32. This may also be done with tiered trays 330 in FIG. 23. In each tiered group of trays, the tray tiering means includes a pivot means (including bar portions 356c on a lower tray in notches 358d on an upper tray in FIGS. 20, 21 and 23; and bar portions 556c on a lower tray in notches 558d on an upper tray in FIGS. 29 and 32) interengageable on adjacent like trays in tiered relationship so that the upper of the adjacent trays is swingable relative to the adjacent lower like tray about an axis parallel to the tray bottom, extending coaxial with the aforementioned bar portions, and extending perpendicularly to the direction of nesting movement N to permit raising the rear end of the upper tray for displaying articles on its bottom portion while the trays remain firmly interlocked by this pivot means.

Third, trays 30, 130, 330 and 530 are adapted to be tilted as a group in tiered position, as shown in FIG. 34, for display purposes. Then, their interlocked detent elements and bar elements will prevent each upper tray from sliding forwardly on the lower tray by gravity as long as the trays are not tilted too much. These elements horizontally extend transversely to nesting insertion direction N, and include elements 58a, 70 and 71 in FIGS. 1, 2 and 6; elements 154b and 155a in FIGS. 7, 8, 12 and 14; elements 356c, 356d, 356f, 358d and 353 in FIGS. 23 and 24; and elements 553, 556d and 556g in FIGS. 29, 32 and 34. A plurality of some of these elements, spaced along tiering direction T is provided so that the tiered trays may be so located either in vertical alignment or in vertically stepped alignment, as earlier described. In each of these alignments, the elements will be interlocked to prevent the upper tray from sliding forwardly on the lower tray by gravity in any reasonable tilted position, as shown in FIG. 34.

Fourth, trays 530 have one or more suitable retainers 561 for preventing articles on bottom portion 531 of a tilted tray, such as shown in FIGS. 32 and 34 from falling by gravity out of the open side when the end of the tray opposite said open side is raised for display purposes. Here, retainers 561 extend across both front open side 534 and rear open side 535, and extend above bottom portion 531 to provide their retaining action. Hence, they will hold the articles within the tilted tray in any event, whether side 534 or side 535 is lowermost after tilting.

Fifth, trays 330 and 530 in their respective tiered positions in FIGS. 23 and 32 transmit the load from the upper tray to the lower tray through the respective downwardly opening hooks or detents 358d and 558d, two in number on each tray with one located contiguous to each of the opposite horizontal boundaries of the open side. It has been found that trays with this construction may be weak at this load transmission zone if the support bars, such as cross bars 553, are provided on the bottom of the receptacle only to the left of detent 558d and rearwardly from the open front side 534 thereof, as shown in FIG. 37 for example. Therefore, suitable reinforcing means has been provided in tray 330 in FIG. 20 and trays 530 in FIGS. 32 and 36 contiguous to these detents, and rigid with some of the tray portions, for strengthening the trays in their tiered relationship contiguous to open sides 334 and 534. This reinforcing means takes two different forms. One form includes a vertically extending connecting bar 570 in FIG. 36, one for each detent 558d in FIG. 29, welded at its upper end to bar portion 554a and at its lower end to the top of detent 558d. A second form of reinforcing means includes two bar portions (the two leftmost bar portions 353 in FIG. 20 and the two rightmost bar portions 553 in FIG. 32) straddling each of these detents 358d and 558d respectively, extending generally transverse to nesting or inserting direction N, and rigidly secured to bars 354 and 554 in the side portions and to bars 351 and 551 in the bottom portions 331 and 531 respectively.

Clearway forming means or clearways 39, 139, 239, 339 and 539 have generic features to permit this nesting action. Each clearway horizontally extends in its associated tray inwardly from the open side portion or open end of the tray, is located vertically between the upper and lower support portions, extends inwardly to a position occupied by the bottom portion of the upper tray when the trays are nested (as shown in FIGS. 4, 10 and 11; by the lower three trays in FIGS. 18 and 19; in FIGS. 25 and 26; and in FIG. 35), and has a plane parallel to and above the bottom portion along which plane the leading end 31a, 131a, 231a, 331a or 531a of the bottom portion of the upper tray enters laterally into the clearway, as shown in FIG. 3 for example, and moves horizontally relative to the lower tray in the nesting direction N with the tiering support portions of the upper and lower trays passing each other as the upper tray is moved through the clearway to the final nested position.

In each case the clearway provided in said end nesting receptacle is bounded by the planiform bottom on the bottom side, by the vertical support members located at each opposite side and near the side of the tray wherein the clearway entrance is located, and at the top the clearway is bounded only by the inward projections of the top support sections but not by any structural tie completely and directly across the top of the receptacle at the open end at which the clearway entrance is located. This structure thus permits the entrance of the lower protruding support section of a like tray, as well as the entrance of the vertical support members located at the opposite end of a like tray, which support members move horizontally in direction N between the inward projections of the top support sections of the lower tray, while the lower protruding support section moves horizontally in direction N under the inward projections of the top support sections.

In the final nested positions of FIGS. 4, 10 and 11, shown by the lower three trays in FIGS. 18 and 19, of FIGS. 25 and 26, or of FIG. 35, opposite sides 42 and 43, 142 and 143, 242 and 243, 342 and 343, or 542 and 543 are respectively in vertical alignment with the bottom portions of the trays extending parallel to each other, spaced vertically apart and extending in the direction of the nesting movement, with the bottom portions compactly nested vertically to take up minimum space instead of being strung out horizontally to take up more storage space, and with the bottom portions of the nested trays vertically spaced apart a sufficient distance to permit the insertion of a tray raising portion, or fork, of a lift truck for lift truck handling of the trays.

Also, in each of these final nested positions, each tray has a nesting support portion (contiguous to its open end 34, 134, 234, 334 or 534) dimensioned to engage in nested position the same nesting support portions on upper and lower like adjacent trays to provide a solid support contiguous to this end in nested position to provide adequate strength to support a high nested stack. Such nesting support portions include bottom parts 53 and 54 in FIGS. 1 and 4a; parts 54 and 67' in FIG. 4b; parts shown at the lower left in FIGS. 10, 18 and 25; and parts at the lower right in FIG. 35.

In nested position, the additional opposite horizontal perimeter sides may be in either vertical alignment as shown by sides 44 and 45 in FIG. 4, sides 144 and 145 in FIG. 10, sides 344 and 345 in FIG. 25, or sides 544 and 545 in FIG. 35; or may be in vertically stepped alignment, as shown by sides 244 and 245 on the lower three trays in FIG. 18. The vertical alignment is possible with trays 30, 130, 330 or 530 because back portions 35, 135, 335 or 535 nest together since members or elements 60, 61, 62, 63, 64 and 65 in FIGS. 1–4; members 160 and 162 and portions 155b in FIGS. 7, 8, 10 and 11; portions 356b, 356j and 358b and members 359; or portions 556b, 556j, 556k, and 558b have surfaces angularly inclined with respect to their respective bottom portions 31, 131, 331 or 531 so as to nest with like surfaces on like nesting trays in the nested positions, as shown in FIG. 4, FIGS. 10 and 11, FIGS. 25 and 26, or FIG. 35. In the vertically stepped alignment in FIGS. 18 and 19, the sides 244 and 245 are in vertically stepped alignment because each back side portion 335 is composed of component members 262 and 263 extending vertically from bottom portion 231 so that the back portions abut in nested position, as shown by the engagement of members 262 and 263 with member 268 in FIG. 18, with these back portions out of alignment by the thickness of these structural members preventing complete nesting. This latter construction shown in FIGS. 18 and 19 is especially adapted for warehouse pellets wherein each tray has a large vertical height wherein this stepped alignment in nesting condition may not be too serious and there may be an advantage in minimizing the slant of back portion 235 from the standpoint of strength. If desired, a substantially solid or enclosed back portion may be provided with a panel extending the full distance between members 262 and 263 in FIG. 16 to provide greater strength. Of course, with this stepped nesting in FIG. 18, the higher the stack of nested trays becomes, the more lopsided it becomes. Although this might make it impractical for small trays of small vertical height, this tray design works satisfactorily for warehouse pallets or trays with a large vertical height, as shown in FIGS. 15–19.

The nesting described heretofore is group nesting, as shown in FIGS. 4, 4a, 10, 11, 18, 19, 25 and 26, or 35. In each of these figures, the bottom portions 31, 131, 231, 331 or 531 in like trays are substantially in top-to-bottom abutting contact in nested position to form this group nested stack. This system of nesting has many advantages, such as, the nested stack is of minimum height for a given number of trays (compare FIGS. 4a and 4b), the top tray may be disassembled from the nesting position with minimum difficulty since the fits between the like trays are not as close in FIG. 4a as in FIG. 4b, and this group nesting provides a controlled weight in each stack of nested trays since there is a definite maximum height to a nested stack. Note that each stack height will be less than twice the height of one of said like trays because, as shown in FIG. 4a, when this height is reached, an additional bottom portion 31 cannot be inserted into the clearway because side rail members 58b and 58c block its insertion. The same is true in FIGS. 11, 19, 26 and 35.

FIG. 4b illustrates trays in a continuously nested stack. Only this first tray form in FIGS. 1–4a is described in this manner, but it should be readily apparent that the description applies with equal force to slight modification of the tray forms in FIGS. 7, 15, 20, and 29–37 by utilizing the same basic principals by securing to, or otherwise forming on, the bottom of each tray equivalents of strip 75. As mentioned before, tray 30' in FIG. 4b is identical to tray 30 in FIG. 1 except that cleats 66, 67, 68 and 69 in FIG. 2 have been increased in vertical height by strip 75, as shown for example by cleats 67' in FIG. 4b. This structure permits one to accurately control the vertical spacing between the nested trays so that the like trays may be nested in a continuously nested stack to any desired height, and certainly over twice the height of one of the like trays, because side rails 58b and 58c do not prevent the insertion of bottom portions 31 above this height because they are in vertically spaced apart and alternately arranged relationship. Although cleats 67' are shown in FIG. 4b as having a greater height dimension than the corresponding cleats in FIG. 2, it should be readily understood that any vertical spacing means could be used, rigidly connected to any of the means or portions of the tray, to maintain the bottoms 31 in vertically spaced relationship in nested position with rails 58b and 58c alternately arranged therebetween so that continuous stacking of FIG. 4b could be achieved.

Continuous nesting has several advantages. First, more clearance space is provided under each of the bottoms 44 for insertion of the fork or tongue of the lift truck for tray manipulation thereby. Second, the structural parts of the trays do not have to be constructed so precisely in continuous nesting because they do not nest so tightly against each other as in group nesting. Compare the tightness in FIG. 4a with the spacing between the parts in FIG. 4b. Third, the nesting members on the trays (members 60, 61, 62, 63, 64 and 65 in FIGS. 1–4; members 155b, 160 and 162 in FIGS. 7, 8, 10 and 11; members 264 and 265 in FIGS. 15 and 16; members 356b, 356j, 358b and 359b in FIGS. 20, 21, 25 and 26; and members 556b, 556j and 558b in FIGS. 29, 30, 31 and 35) can be inclined closer to the vertical since they do not nest so far down into each other in the continuous nesting position. Fourth, rear members 262 and 263 in FIGS. 16 and 19 and front members 264 and 265 could be slanted in continuous nesting upwardly toward the right in FIG. 18 so that the trays in the vertical nested stack would remain in vertical alignment instead of moving forwardly toward the left in the upward direction, as shown in FIG. 18.

Each of these nesting arrangements has the advantage that the top tray in a nested group provides an unobstructed space in which to place a dolly, a nested group of intermediate shelves, or any other auxiliary equipment which may be used without increasing the total storage space.

Various changes in details and arrangements of parts can be made by one skilled in the art without departing from either the spirit of this invention or the scope of the appended claims.

What is claimed is:

1. A tray adapted for tiering and end nesting with other like trays, comprising a bottom means, upwardly extending means rigidly connected with said bottom means, a plurality of upper tiering support portions rigid with said upwardly extending means, a plurality of lower tiering support portions rigid with one of said means, said upper support portions being vertically spaced above said lower support portions, said support portions being positioned to mutually engage and hold an upper like tray firmly and evenly in tiered position by engagement of the upper support portions on the tray with lower support portions of an upper like tray, said aforementioned means and portions forming a horizontally extending clearway in said tray extending inwardly from one end of said tray to permit passage of a bottom means of a like tray to an in position located vertically between said upper and lower support portions and then permitting the bottom means of a like tray to be released from said in position to assume its nested position, the dimensions of said tray permitting a leading end of the bottom means of said like tray to enter laterally into the clearway with the bottom means of said like tray above the bottom means of tray and to be moved horizontally relative thereto in a given direction, the dimensions of said tray permitting said tiering support portions of said like tray to clear and to pass said support portions of said tray during movement of said like tray through said clearway to final nested position.

2. A tray, as set forth in claim 1, with each of said means including wood members.

3. A tray, as set forth in claim 1, with one of said tiering support portions including at least one rod-like wire bar and the other of said tiering support portions including at least one detent for straddling said bar in tiered position.

4. A tray, as set forth in claim 3, with said upper support portions having said bar and said lower support portions having said detent.

5. A tray, as set forth in claim 3, with said lower support portions having said bar and said upper support portions having said detent.

6. A tray, as set forth in claim 1, with one of said tiering support portions including for its support portions a plurality of rod-like wire bars extending transversely to and spaced given distances apart along said given direction, the other of said tiering support portions including for its portions a plurality of detents opening vertically away from said bars on the same tray with said detents spaced a given distance apart along said given direction, said tray including coplanar surfaces connecting said upper tiering support portions so that the leading end of said like tray may be slid along said coplanar surfaces into tiered position, the given distance between the two lower tiering support portions closest to said leading end on said like tray being different from said given distance between the remaining lower tiering support portions on said like tray so that as the leading end of said like tray is slid into tiered position and two lower portions will not both simultaneously engage the upper support portions of said tray to impede the travel of said like tray to tiered position.

7. A tray adapted for tiering and end nesting with other like trays, comprising a bottom means, upwardly extending means rigidly connected with said bottom means, a plurality of upper tiering support portions rigid with said upwardly extending means, a plurality of lower tiering support portions rigid with one of said means, said upper support portions being vertically spaced above said lower support portions, said support portions being positioned to mutually engage and hold an upper like tray firmly and evenly by engagement of the upper support portions on the tray with lower support portions of an upper like tray, said aforementioned means and portions forming a horizontally extending clearway in said tray extending inwardly from one end of said tray to permit passage of a bottom means of a like tray to an in position and then permitting the bottom means of a like tray to be released from said in position to assume its nested position, the dimensions of said tray permitting the bottom means of said like tray to enter laterally into the clearway to a final nested position when moved relative thereto, the dimensions of said tray permitting said tiering support portions of said like tray to clear and to pass said support portions of said tray during movement of said like tray through said clearway to said final nested position wherein the horizontal perimeter dimensions of said trays vertically align in said nested position, said upwardly extending means having surfaces angularly inclined to said bottom means to nest with like surfaces on said like tray in nested position.

8. A tray adapted for tiering and end nesting with other like trays, comprising a bottom means, upwardly extending means rigidly connected with said bottom means, a plurality of upper tiering support portions rigid with said upwardly extending means, a plurality of lower tiering support portions rigid with one of said means, said upper support portions being vertically spaced above said lower support portions, said support portions being positioned to mutually engage and hold an upper like tray firmly and evenly by engagement of the upper support portions on the tray with lower support portions of an upper like tray, said aforementioned means and portions forming a horizontally extending clearway in said tray extending inwardly from one end of said tray to permit passage of a bottom means of a like tray to an in position and then permitting the bottom means of a like tray to be released from said in position to assume its nested position, said clearway having a plane parallel to the bottom means of said tray along which plane said like tray moves through said clearway to nested position, the dimensions of said tray permitting the bottom means of said like tray to enter laterally into the clearway and to be moved relative thereto, the dimensions of said tray permitting said tiering support portions of said like tray to clear and to pass said support portions of said tray during movement of said like tray through said clearway to said nested position.

9. A tray adapted for tiering and end nesting with other like trays, comprising a bottom means, upwardly extending means rigidly connected with said bottom means, a plurality of upper tiering support portions rigid with said upwardly extending means, a plurality of lower tiering support portions rigid with one of said means, said upper support portions being vertically spaced above said lower support portions, said upwardly extending means including on the horizontal perimeter outline of said tray two opposite sides, said support portions being positioned to mutually engage and hold an upper like tray firmly and evenly with said opposite sides of the horizontal perimeter outlines of said trays respectively in vertical alignment by engagement of the upper support portions on the tray with lower support portions of an upper like tray, said aforementioned means and portions forming a horizontally extending clearway in said tray extending inwardly from one end of said tray to permit passage of a bottom means of a like tray to an in position and then permitting the bottom means of a like tray to be released from said in position to assume its nested position, the dimensions of said tray permitting the bottom means of said like tray to enter laterally into the clearway and to be moved relative thereto, the dimensions of said tray permitting said tiering support portions of said like tray to clear and to pass said support portions of said tray during movement of said like tray through said clearway to final nested position, the dimensions of said trays permitting them in final nested position to have at least said opposite sides of the horizontal perimeter outlines of said trays respectively in vertical alignment.

10. A tray adapted for tiering and end nesting with other like trays, comprising a bottom means, upwardly extending means rigidly connected with said bottom means, a plurality of upper tiering support portions rigid with said upwardly extending means, a plurality of lower tiering support portions rigid with one of said means, said upper support portions being vertically spaced above said lower support portions, said upwardly extending means including on the horizontal perimeter outline of said tray two opposite sides, said support portions being positioned to mutually engage and hold and support an upper like tray firmly and evenly with said opposite sides of the horizontal perimeter outlines of said trays respectively in vertical alignment with one group of said lower support portions of said upper tray engaged upon one group of said upper support portions of a lower tray, said support portions being positioned to mutually engage and hold and support said upper tray firmly and evenly with said opposite sides of the horizontal perimeter outline of said trays arranged respectively in vertically stepped alignment with another group of said lower support portions of said upper tray engaged upon another group of said upper support portions of said lower tray, said aforementioned means and portions forming a horizontally extending clearway in said tray extending inwardly from one end of said tray to permit passage of a bottom means of a like tray to an in position and then permitting the bottom means of a like tray to be released from said in position to assume its nested position, the dimensions of said tray permitting the bottom means of said like tray to enter laterally into the clearway and to be moved relative thereto, the dimensions of said tray permitting said tiering support portions of said like tray to clear and to pass said support portions of said tray during movement of said like tray through said clearway to final nested position.

11. A tray adapted for tiering and end nesting with other like trays, comprising a bottom means, upwardly extending means rigidly connected with said bottom means and leaving an open end on said tray, a plurality of upper tiering support portions rigid with said upwardly extending means, a plurality of lower tiering support portions rigid with one of said means, said upper support portions being vertically spaced above said lower support portions, said upwardly extending means including on the horizontal perimeter outline of said tray two opposite sides, said support portions being positioned to mutually engage and hold and support an upper like tray firmly and evenly with said opposite sides of the horizontal perimeter outlines of said trays respectively in vertical alignment with one group of said lower support portions of said upper tray engaged upon one group of said upper support portions of said tray as a lower tray, said support portions being positioned to mutually engage and hold and support said upper tray firmly and evenly with said opposite sides of the horizontal perimeter outlines of said trays arranged respectively in vertically stepped alignment with the open ends of said trays being in stepped relation and facing the same direction for display purposes with another group of said lower support portions of said upper tray engaged upon another group of said upper support portions of said lower tray, said aforementioned means and portions forming a horizontally extending clearway in said tray extending inwardly from said open end of said tray to permit passage of a bottom means of a like tray to an in position and then permitting the bottom means of a like tray to be released from said in position to assume its nested position, the dimensions of said tray permitting the bottom means of said like tray to enter laterally into the clearway and to be moved relative thereto, the dimensions of said tray permitting said tiering support portions of said like tray to clear and to pass said support portions of said tray during movement of said like tray through said clearway to final nested position.

12. A tray adapted for tiering and end nesting with other like trays, comprising a bottom means, upwardly extending means rigidly connected with said bottom means and leaving an open end on said tray, a plurality of upper tiering support portions rigid with said upwardly extending means, a plurality of lower tiering support portions rigid with one of said means, said upper support portions being vertically spaced above said lower support portions, said support portions being positioned to mutually engage and hold and support an upper like tray firmly and evenly with the open ends of said trays facing in suitable directions for display and access purposes by engagement of the upper support portions on the tray with lower support portions of an upper like tray, said aforementioned means and portions forming a horizontally extending clearway in said tray extending inwardly from said open end of said tray to permit passage of a bottom means of a like tray to an in position occupied by the bottom means of a like tray to be released from said in position to assume its nested position, the dimensions of said tray permitting the bottom means of said like tray to enter laterally into the clearway and to be moved relative thereto, the dimensions of said tray permitting said tiering support portions of said like tray to clear and to pass said support portions of said tray during movement of said like tray through said clearway to final nested position.

13. A tray adapted for tiering and end nesting with other like trays, comprising tray boundary means including interconnected bottom and side portions forming at least one open side, tray tiering means rigid with said boundary means for holding like trays in tray supporting tiered relationship, and clearway forming means rigid with said boundary means for receiving the bottom portion of a like tray so that the bottom portion of a like tray is insertable horizontally and laterally through said open side into a tray nested position with said tray.

14. A tray, as set forth in claim 13, with vertical spacing means rigid with said afore-recited means to maintain said bottom portions in vertically spaced relationship in nested position so that like trays may be nested in a continuously nested stack over twice the height of one of said trays.

15. A tray, as set forth in claim 13, with said bottom portions in top to bottom abutting contact in nested position in a group nested stack with the maximum stack height less than twice the height of one of said trays.

16. A tray, as set forth in claim 13, with each of said means and said portions being made of wire.

17. A tray adapted for tiering and end nesting with other like trays, comprising tray boundary means including interconnected bottom and side portions forming at least one open side, tray tiering means rigid with said boundary means for holding like trays in tray supporting tiered relationship, and clearway forming means rigid with said boundary means for receiving the bottom portion of a like tray so that the bottom portion of a like tray is insertable laterally through said open side into a tray nested position with said tray with the horizontal perimeter dimensions of said trays generally vertically aligned in nested position, said side portion having elements with surfaces angularly inclined to said bottom portion to nest with like surfaces on a like tray in nested position.

18. A tray adapted for tiering and end nesting with other like trays, comprising tray boundary means including interconnected bottom and side portions forming at least one open side, tray tiering means rigid with said boundary means for holding like trays in tray supporting tiered relationship, and clearway forming means rigid with said boundary means for receiving the bottom portion of a like tray so that the bottom portion of a like tray is insertable laterally by a movement of said like tray through said open side into a tray nested position with the tray bottom portions extending parallel to each other and in the direction of said movement.

19. A tray adapted for tiering and end nesting with other like trays, comprising tray boundary means including interconnected bottom and side portions forming at least one open side and having on its horizontal perimeter outline at least two opposite sides, tray tiering means rigid with said boundary means for holding like trays in tray supporting tiered relationship with said opposite sides of the horizontal perimeter outlines of said trays respectively in vertical alignment, and clearway forming means rigid with said boundary means for receiving the bottom portion of a like tray so that the bottom portion of a like tray is insertable laterally through said open side into a tray nested position with said opposite sides of the horizontal perimeter outlines of said trays respectively in vertical alignment.

20. A tray, as set forth in claim 19, with said boundary means including on the horizontal perimeter tray outline at least two additional oppoist sides right angularly related to said first recited two opposite sides, said means being constructed so that said two additional opposite sides are respectively in vertical alignment in tiered relationship and in vertically stepped alignment in nested position.

21. A tray, as set forth in claim 19, with said boundary means including on the horizontal perimeter tray outline at least two additional opposite sides right angularly related to said first recited two opposite sides, said means being constructed so that said two additional opposite sides are respectively in vertical alignment in tiered relationship and in vertical alignment in nested position.

22. A tray, as set forth in claim 19, with one of said side portions being a back side portion located most remote from said open side, said back side portion being composed of components extending vertically from said bottom portion so that said back portions abut in nested position and said trays are in vertically stepped alignment.

23. A tray adapted for tiering and end nesting with other like trays, comprising tray boundary means including interconnected bottom and side portions forming at least one open side and having on its horizontal perimeter outline at least two opposite sides, first tray tiering means rigid with said boundary means for holding like trays in tray supporting vertical tiered relationship with said opposite sides of the perimeter outlines of said trays respectively in vertical alignment, second tray tiering means rigid with said boundary means for holding like trays in tray supporting vertical tiered relationship with said opposite sides of the horizontal perimeter outlines of said trays arranged respectively in vertically stepped alignment, and clearway forming means rigid with said boundary means for receiving the bottom portion of a like tray so that the bottom portion of a like tray is insertable laterally through said open side into a tray nested position with said tray.

24. A tray, as set forth in claim 23, with said first and second tray tiering means including four spaced apart cleats secured to the bottom surface of said bottom portion and arranged in two spaced apart parallel lines.

25. A tray, as set forth in claim 23, with said second tray tiering means including positioning means maintaining the open sides of said trays in stepped relationship for display purposes.

26. A tray adapted for tiering and end nesting with other like trays, comprising tray boundary means including interconnected bottom and side portions forming at least one open side, tray tiering means rigid with said boundary means for holding like trays in tray supporting tiered relationship with said open sides facing in suitable directions for display and access purposes, and clearway forming means rigid with said boundary means for receiving the bottom portion of a like tray so that the bottom portion of a like tray is insertable laterally through said open side into a tray nested position with said tray.

27. A tray adapted for tiering and nesting with trays of like construction, comprising rigidly interconnected parts including a bottom load supporting part, and two generally parallel side parts rigidly connected with said bottom part along opposite sides of said tray, said aforementioned parts including upper tiering support portions rigidly connected with said side parts, said aforementioned parts including lower tiering support portions rigidly connected with said bottom part, said upper support portions being above corresponding lower support portions for permitting the lower support portions of an upper tray to engage and rest upon the corresponding upper support portions of a like lower tray in tiering position, said aforesaid parts and portions of said tray interfering with movement in a given direction of one tray relative to another like tray to provide nesting thereof, and said parts and portions arranged to provide a clearway permitting movement of said upper tray at an angle to said given direction to facilitate movement into nesting position within said lower tray, said bottom part having on its bottom surface bar portions located along two generally parallel lines extending from one to the other of said side parts, each side part having two upwardly converging portions, the dimensions of said tray permitting said bar portions of an upper tray to straddle said converging portions of a lower tray in one of said positions to locate said trays against substantial relative movement in opposite directions generally parallel to said side parts.

28. A tray, as set forth in claim 27, with said parts having first stop portions rigid with said bar portions and having second stop portions rigid with said converging portions, the dimensions of said receptacle permitting said first and second stop portions on trays in said one position to be in straddling relationship to prevent substantial relative movement generally perpendicular to said side parts.

29. A tray, as set forth in claim 28, with said bar parts consisting of two parallel wires, each side part including a single wire bent to form its said two converging portions and a connecting portion providing one of said second stop portions, each side of said tray having a wire with spaced portions rigid with said bar portions in said bottom part contiguous to said parallel lines and having a connecting portion bridging the space between said parallel lines and containing of one said first stop portions.

30. A tray adapted for tiering and nesting with trays of like construction, comprising rigidly interconnected parts including a bottom load supporting part, and side parts rigidly connected with said bottom part along opposite parallel sides of said tray, said aforementioned parts including upper tiering support portions rigidly connected with said side parts, said aforementioned parts including lower tiering support portions rigidly connected with said bottom part, said upper support portions being above corresponding lower support portions for permitting the lower support portions of an upper tray to engage and rest upon the corresponding upper support portions of a like lower tray in tiering position, said aforesaid parts and portions of said tray interfering with movement in a given direction of one tray relative to another like tray to provide nesting thereof, and said parts and portions arranged to provide a clearway permitting movement of said upper tray at an angle to said given direction to facilitate movement into nesting position within said lower tray; a continuous wire bar forming by suitable bends the top boundaries of said side parts with said upper tiering support portions each including an upwardly bent portion in one of said top boundaries contiguous to opposite ends of said side parts, opposite bottom edges of said bottom part extending between opposite ends of said side parts, and an end on each side part downwardly sloping toward said bottom part from an end of one of said top boundaries to an end of one bottom edge, said lower tiering support portions including eyelets in said bottom part, the dimensions of said tray permitting said eyelets in an upper tray to be placed downwardly onto said bent up portions in a lower like tray in said tiering position.

31. A tray, as set forth in claim 1, with said tray having a nesting support portion contiguous to said one end and dimensioned to engage in nested position the same nesting support portions on upper and lower like adjacent trays to provide a solid support contiguous to said one end in said nested position.

32. A tray, as set forth in claim 13, with said tray having said bottom portion adapted to vertically support and said side portions adapted to straddle and laterally guide an upper like tray during movement through said clearway into nested position, whereby the tray user is provided a "feel" while end nesting of like trays.

33. A tray adapted for tiering and end nesting with other like trays, comprising tray boundary means including interconnected bottom and side portions forming at least one open side, tray tiering means rigid with said boundary means for holding like trays in tray supporting tiered position, clearway forming means rigid with said boundary means for receiving the bottom portion of a like tray so that the bottom portion of a like tray is insertable horizontally and laterally in a given direction through said open side into a tray nested position with said tray, and latching means preventing relative movement of like trays in one of said positions in a direction opposite to said given direction.

34. A tray, as set forth in claim 33, with said latching means including a bar extending generally transverse to said given direction and located below the load supporting surface of said bottom portion, and including an upwardly projecting loop in each side portion adapted to engage said bar on a like tray in said one position to prevent movement in said opposite direction.

35. A tray, as set forth in claim 34, with said one position being said tiered position.

36. A tray, as set forth in claim 34, with said one position being said nested position.

37. A tray, as set forth in claim 13, with some of said means including top lock means and bottom lock means located respectively at the top and bottom of said tray and rigid with the tops of said side portions and dimensioned so that the bottom lock means of one tray straddles the top lock means of an adjacent lower like tray in tiered relationship to prevent lateral springing of the tops of said side portions on said lower tray.

38. A tray, as set forth in claim 13, with some of said means including lock means interengageable on adjacent trays in tiered relationship to lock them against relative movement in all directions in a horizontal plane.

39. A tray, as set forth in claim 18, with said tray tiering means including a pivot means interengageable on adjacent like trays in tiered relationship so that the upper of said adjacent trays is swingable relative to the adjacent lower like tray about an axis extending perpendicular to said direction of movement and parallel to said bottom portion for raising one end of said upper tray for displaying articles on said bottom portion while said trays remain firmly interlocked by said pivot means.

40. A tray, as set forth in claim 23, with said tray tiering means including at least one interlockable detent element and bar element horizontally extending transverse to the insertion direction; said tray having one of said elements rigid with said bottom portion and the other of said elements rigid with the top of one of said side portions, and having a plurality of said elements on some of said portions for providing the aforementioned two alignments and for interlocking the tiered trays in each of these alignments so that when the trays are tilted for display purposes, the interlocked elements will prevent the upper tray from sliding forwardly on the lower tray by gravity.

41. A tray, as set forth in claim 13, with said tray tiering means including rigid with some of said portions two downwardly extending detents with one located contiguous to each of the opposite horizontal boundaries of said open side, some of said means including reinforcing means contiguous to said detents and rigid with some of said portions for strengthing said trays in said tiered relationship contiguous to said open side.

42. A tray, as set forth in claim 41, with said reinforcing means including two bar portions straddling each of said detents, extending generally transverse to the inserting direction into nested position, and rigidly secured to all of said portions.

43. A tray, as set forth in claim 13, with some of said means including a retainer extending across an open side, rigid with said bottom portion, and extending above said bottom portion for preventing articles on said bottom portion from falling out of said last mentioned open side when the tray end opposite said open side is raised for display purposes.

44. A tray adapted for tiering and end nesting with other like trays, comprising tray boundary means including interconnected bottom and side portions forming at least one open side, tray tiering means rigid with said boundary means for holding like trays in tray supporting tiered position after relative movement of an upper like tray relative to a lower like tray in a tiering direction into said tiered position, and clearway forming means rigid with said boundary means for receiving the bottom portion of an upper like tray within a clearway of a lower like tray so that the leading end of the bottom portion of the upper like tray is insertable horizontally and laterally in a nesting direction through said open side into a tray nested position with said lower tray, at least some of said means including a guide means formed so that said upper like tray located above the bottom portion and outside of said open side of said lower like tray is movable generally horizontally in one of said directions with sliding contact by said guide means on said like trays into one of said positions, said guide means including longitudinally extending portions interengageable on vertically adjacent trays to define the path of said generally horizontal movement and to prevent substantial lateral relative movement of said trays with respect to said path.

45. A tray, as set forth in claim 44, with some of said means including a camming surface, first lock portions and second lock portions constructed and arranged so that said first lock portions contiguous to the leading end on the upper tray engage said camming surface on the lower tray on the approach side of said one position during movement in said direction so that said upper tray is cammed upwardly and dropped downwardly into locking relationship with at least a portion of said second lock portions on said lower tray to lock said trays in said one position.

46. A tray, as set forth in claim 45, with said one position being said nested position, said first lock portions being transversely extending bar portions, said camming surface including at least one upwardly extending hump, said guide means including a guide rail extending smoothly from contiguous said open side to said camming surface in each of said side portions so that movement of the upper tray in said direction is substantially smooth until latching occurs by interlocking said lock portions.

47. A tray, as set fourth in claim 45, with said one position being said tiered position, some of said tray tiering means including transversely extending bar portions as said first lock portions and an upwardly opening U-shaped detent as said second lock portions, said guide means including a guide rail extending smoothly from contiguous said open side to said camming surface in each of said side portions for smoothly guiding said bar portions during movement in said direction until latching of said lock portions occur in said tiering position.

48. A tray, as set forth in claim 47, with other of said tray tiering means being located contiguous to said open side and constructed to interlock simultaneously with said some tiering means by a simultaneous downward movement of the upper tray.

49. A tray, as set forth in claim 44, with said guide means including guides located contiguous to the top and bottom of each side portion for preventing substantial relative movement of said trays with respect to said path during movement into nesting position.

References Cited in the file of this patent

UNITED STATES PATENTS 2,684,766     Blom _____ July 27, 1954

UNITED STATES PATENT OFFICE
CERTIFICATE OF CORRECTION

Patent No. 3,003,647                                       October 10, 1961

Warren H. Lockwood

It is hereby certified that error appears in the above numbered patent requiring correction and that the said Letters Patent should read as corrected below.

Column 4, line 46, after "longitudinally" insert -- extending bars 153 extend longitudinally --; line 48, after "153a" insert -- and --; column 6, line 19, after "254," insert -- 255, --; column 13, line 38, for "223" read -- 234 --; column 17, line 65, after "of" insert -- said --; column 23, line 11, for "of one" read -- one of --.

Signed and sealed this 1st day of May 1962.

(SEAL)
Attest:

ERNEST W. SWIDER
Attesting Officer

DAVID L. LADD
Commissioner of Patents